(12) United States Patent
Raychaudhuri et al.

(10) Patent No.: US 12,198,426 B2
(45) Date of Patent: Jan. 14, 2025

(54) COMPUTER VISION SYSTEMS AND METHODS FOR ACCELERATION OF HIGH-RESOLUTION MOBILE DEEP VISION WITH CONTENT-AWARE PARALLEL OFFLOADING

(71) Applicant: Rutgers, The State University of New Jersey, New Brunswick, NJ (US)

(72) Inventors: Dipankar Raychaudhuri, Princeton Junction, NJ (US); Wuyang Zhang, Bellevue, WA (US); Yanyong Zhang, Metuchen, NJ (US); Yunxin Liu, Beijing (CN); Marco Gruteser, Princeton, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 50 days.

(21) Appl. No.: 17/689,089

(22) Filed: Mar. 8, 2022

(65) Prior Publication Data
US 2022/0292819 A1    Sep. 15, 2022

Related U.S. Application Data

(60) Provisional application No. 63/159,371, filed on Mar. 10, 2021.

(51) Int. Cl.
*G06V 20/20* (2022.01)
*G06T 3/4046* (2024.01)
(Continued)

(52) U.S. Cl.
CPC ............ *G06V 20/20* (2022.01); *G06T 3/4046* (2013.01); *G06T 7/11* (2017.01); *G06T 11/00* (2013.01);
(Continued)

(58) Field of Classification Search
CPC ......... G06T 7/11; G06T 11/00; G06T 3/4053; G06T 3/4046; G06T 2207/20021;
(Continued)

(56) References Cited

U.S. PATENT DOCUMENTS 10,452,971 B2    10/2019  Chung et al.
11,627,444 B2 *   4/2023  Ruan ................. H04W 36/0033
                                                               370/252
(Continued)

FOREIGN PATENT DOCUMENTS

CN           111176820 A      5/2020

OTHER PUBLICATIONS

Yu, et al., "A New Algorithm Based on Region Partitioning for Filtering Candidate Viewpoints of a Multiple Viewshed," International Journal of Geographical Information Science (2016) (19 pages).

(Continued)

*Primary Examiner* — Xilin Guo
(74) *Attorney, Agent, or Firm* — McCarter & English, LLP

(57) ABSTRACT

Computer vision systems and methods for acceleration of high-resolution mobile deep vision with content-aware parallel offloading are provided. The system allows for acceleration of deep vision applications running on mobile devices via offloading of machine learning computations on edge cloud infrastructure, and speeds up computation via parallel processing on the edge cloud, employing one or more of the following processes: recurrent region proposal prediction, region proposal centric frame partitioning, and resource-aware offloading to multiple processors. Mobile deep vision applications can utilize the systems and methods disclosed herein to accelerate application processing. The system offloads computation to multiple servers to minimize (Continued)

the end-to-end latency, and includes a high-resolution mobile deep vision task acceleration system that offloads computation to multiple (edge located) servers.

20 Claims, 21 Drawing Sheets

(51) Int. Cl.
    *G06T 7/11*         (2017.01)
    *G06T 11/00*       (2006.01)
    *G06V 10/22*       (2022.01)
    *G06V 10/74*       (2022.01)
    *G06V 10/82*       (2022.01)

(52) U.S. Cl.
    CPC .............. *G06V 10/22* (2022.01); *G06V 10/74* (2022.01); *G06V 10/82* (2022.01); *G06T 2207/20021* (2013.01); *G06T 2207/20084* (2013.01); *G06V 2201/10* (2022.01)

(58) Field of Classification Search
    CPC ... G06T 2207/20084; G06T 7/00; G06T 7/12; G06T 7/13; G06T 2207/20081; G06T 2207/10016; G06T 7/20; G06T 2210/12; G06V 10/22; G06V 10/82; G06V 10/74; G06V 10/25; G06V 20/20; G06V 10/255; G06V 2201/10; G06V 10/764; G06V 10/26; G06V 10/267; G06V 30/10; G06V 2201/07; G06V 10/44; G06V 20/58
    See application file for complete search history.

(56) References Cited

U.S. PATENT DOCUMENTS

| | | |
|---|---|---|
| 2019/0266015 A1 | 8/2019 | Chandra et al. |
| 2020/0275156 A1* | 8/2020 | He ..................... H04N 21/4126 |
| 2022/0053171 A1* | 2/2022 | Naphade .......... G08B 13/19673 |
| 2022/0180102 A1* | 6/2022 | Anantha ............ G06V 10/7788 |
| 2022/0188028 A1* | 6/2022 | Mesnier ................. G06F 3/067 |

OTHER PUBLICATIONS

Wang, et al., "Convergence of Edge Computing and DeepLearning: A Comprehensive Survey," arXiv:1907.08349v3, Jan. 28, 2020 (36 pages).

Zhao, et al., DeepThings: Distributed Adaptive Deep Learning Inference on Resource-Constrained IoT Edge Clusters, IEEE Transactions on Computer-Aided Design of Integrated Circuits and Systems, Oct. 2018 (12 pages).

Mao, et al., "MoDNN: Local Distributed Mobile Computing System for Deep Neural Network," Design, Automation & Test in Europe Conference & Exhibition (2017) (6 pages).

Chen, et al., "Deep Learning With Edge Computing: A Review," vol. 107, No. 8, Aug. 2019 (20 pages).

Zhang, et al., "Elf: Accelerate High-Resolution Mobile Deep Vision with Content Aware Parallel Offloading," ACM MobiCom '21, Oct. 25-29, 2021 (14 pages).

Naderiparizi, et al., Glimpse: A Programmable Early-Discard Camera Architecture for Continuous Mobile Vision,: in Proceedings of the 15th Annual International Conference on Mobile Systems, Applications, and Services (2017) (14 pages).

Canel, et al., "Scaling Video Analytics on Constrained Edge Nodes," arXiv:1905.13536v1, May 24, 2019 (13 pages).

Li, et al., "Reducto: On-Camera Filtering for Resource-Efficient Real-Time Video Analytics, " in Proceedings of the Annual conference of the ACM Special Interest Group on Data Communication on the Applications, Technologies, Architectures, and Protocols for Computer Communication (2020) (18 pages).

Du, et al., "Server-Driven Video Streaming for Deep Learning Inference," in Proceedings of the Annual Conference of the ACM Special Interest Group on Data Communication on the Applications, Technologies, Architectures, and Protocols for Computer Communication (2020) (14 pages).

* cited by examiner (a) Equal partitioning (B) Ideal partitioning

COMPUTER VISION SYSTEMS AND METHODS FOR ACCELERATION OF HIGH-RESOLUTION MOBILE DEEP VISION WITH CONTENT-AWARE PARALLEL OFFLOADING

RELATED APPLICATIONS

The present application claims the priority of U.S. Provisional Application Ser. No. 63/159,371 filed on Mar. 10, 2021, the entire disclosure of which is expressly incorporated herein by reference.

STATEMENT OF GOVERNMENT INTERESTS

This invention was made with government support under Grant No. CNS-134529 awarded by the National Science Foundation. Accordingly, the government has certain rights in the invention.

BACKGROUND

Technical Field

The present disclosure relates to the field of computer vision technology. More specifically, the present disclosure relates to computer vision systems and methods for acceleration of high-resolution mobile deep vision with content-aware parallel offloading.

Related Art

The field of computer vision has been rapidly developing in recent years. To be effective, computer vision applications performing real-time image processing (e.g., on/in an automobile, mobile devices, or other devices such as devices attached traffic light poles monitoring traffic/pedestrians) require fast real-time responses, and have high demand for processor power and storage. As a result, existing solutions require dedicated and powerful servers to which the entire real-time image process can be offloaded. These servers are remote (e.g., located in one or more cloud platforms) and impose high latency that makes advanced applications such as those that require computer vision and artificial intelligence processing impossible.

To address this situation, smaller, local (edge) servers have been utilized as a solution. Edge computing is a distributed computing paradigm that brings compute, storage, and applications closer to where users, facilities, and connected things generate, consume, and/or leverage data. To date, various companies are providing or planning to provide mobile edge technologies, but such technologies are currently in their infancy. Further, enterprises across various industries are beginning to drive new levels of performance and productivity by deploying different technological innovations, such as sensors and other data-producing and collecting devices, along with analysis tools. Traditionally, data management and analysis are being performed in the cloud or data centers. However, the scenario seems to be changing with the increasing penetration of network-related technologies and initiatives, such as smart manufacturing, smart cities, etc. Although the adoption is presently not common, over the forecast period, some large enterprises, especially across industries, such as telecommunications and manufacturing, are expected to use mobile edge computing (MEC), especially concerning Internet-of-Things (IoT) technologies.

As enterprises embrace these new technologies, the need to analyze essential data in near real-time has become more critical. The demand has become vital across many industries, including manufacturing, healthcare, telecommunications, and finance. Moreover, the explosion of data pushed this need further, and made several factors, such as network latency, very critical. Furthermore, with the current fourth-generation (4G) networks reaching their maximum limit, fifth-generation (5G) networks will need to manage online traffic far more intelligently, in which mobile edge computing will play a significant role. With the management of the data load, MEC is expected to play a substantial part in reducing latency for 5G networks.

The field of computer vision is also experiencing rapid growth in connection with augmented reality (AR) and virtual reality (VR) technologies. Industries interested in AR applications include healthcare for medical imaging/video, automotive for heads-up-displays, e-commerce for buying items virtually, and video games. Core industries taking advantage of VR include video gaming, the entertainment industry, communications, health care, automotive, and design industries. Additionally, the need for remote work/school is expected to further support the VR and AR industries.

In the past few years, there has been rapid development of Deep Neural Networks (DNNs), due to the fast-growing computation power and data availability. Thanks to these advancements, mobile applications, particularly mobile vision applications, enjoy a performance boost in various vision-related tasks such as photo beautification, object detection and recognition, and reality augmentation. However, to achieve state-of-the-art performance, DNN models usually have complicated structures with numerous parameters, hence a high demand in computation and storage. As a result, it is challenging to run full-size DNN models on mobile devices, even running into heat dissipation issues. Meanwhile, mobile deep vision applications are often interactive and require fast or even real-time responses. Examples include adversarial point cloud generation that reconstructs 3D scenes for intuitive surrounding interpretation and video object semantic segmentation that facilitates personal activity recognition. In these cases, it is hard, if not impossible, to satisfy the applications' latency requirements due to the limited processing capacity on mobile devices.

To this end, researchers have spent a great deal of effort to improve the performance of mobile deep vision applications. On the one hand, various techniques have been developed to make DNN models smaller to reduce the computation load, e.g., weight and branch pruning and sharing, tensor quantization, knowledge distillation, and network architecture search. However, these techniques often lead to compromised model accuracy due to the fundamental trade-off between model size and model accuracy. On the other hand, some solutions have proposed to increase the computing resources by using massive accelerators, such as graphics processing units (GPUs), field-programmable gate arrays (FPGAs) and application-specific integrated circuits (ASICs). Nevertheless, due to the fundamental limits of size and power, mobile devices still fall short to meet the requirements of target applications.

To solve these challenges, several offloading approaches have been proposed. By offloading the intensive model inference to a powerful edge server, the inference latency can be significantly reduced. With the high bandwidth and low latency provided by the emerging 5G networks, offloading is promising to provide a good user experience for mobile deep vision applications. However, existing offloading methods are insufficient in two aspects. First, most existing solutions use low-resolution images through the entire pipeline, which makes the inference task lightweight, but lose the opportunity to leverage the rich content of high resolution (e.g., 2K or 4K) images/frames. Taking advantage of such rich information is important for applications such as video surveillance for crowded scenes, real-time autopilot systems, and online high-resolution image segmentation. Second, most existing methods only consider offloading tasks between a single pair of server and client, assuming that no competing clients or extra edge resources available. In practice, a single edge server is equipped with costly hardware, for example, Intel Xeon Scalable Processors with Intel Deep Learning Boost or NVIDIA EGX A100, which are typically shared by multiple clients (e.g., multi-tenant environments). Moreover, the heterogeneous re-source demands of applications running on edge servers and highly-dynamic workloads by mobile users lead to resource fragmentation. If the fragmentation cannot be efficiently utilized, it may produce significant resource waste across edge servers.

In order to meet the latency requirements of deep mobile vision applications with heterogeneous edge computing resources, it is advantageous to offload smaller inference tasks in parallel to multiple edge servers. Such an approach can benefit many real-world deep vision tasks, including multi-person keypoint detection for AR applications and multi-object tracking for autonomous driving tasks, where objects can be distributed to different servers for parallel task processing. Meanwhile, offloading to multiple servers imposes several challenges. First, it requires the client to effectively partition the inference job into multiple pieces while maintaining the inference accuracy. In the case of keypoint detection or instance segmentation, simply partitioning a frame into several slices may split a single instance into multiple slices, therefore, dramatically decreasing the model accuracy. Second, the system needs to be aware of available computation resources on each server and dynamically develops the frame partitioning solution, so that it can ensure no server in the parallel offloading procedure to become the bottleneck. Finally, such a system should have a general framework design that is independent of its host deep vision applications.

Accordingly, what would be desirable are computer vision systems and methods for acceleration of high-resolution mobile deep vision with content-aware parallel offloading, which address the foregoing, and other, needs.

SUMMARY

The present disclosure relates to computer vision systems and methods for acceleration of high-resolution mobile deep vision with content-aware parallel offloading. The system allows for acceleration of deep vision applications running on mobile devices via offloading of machine learning computations on edge cloud infrastructure. The system speeds up computation via parallel processing on the edge cloud, employing one or more of the following processes: recurrent region proposal prediction, region proposal centric frame partitioning, and resource-aware offloading to multiple processors. Mobile deep vision applications, for example, multi-object detection, instance segmentation, and body pose estimation can utilize the systems and methods disclosed herein to accelerate application processing. The system improves performance (particularly real-time latency), particularly for emerging machine learning applications associated with augmented and virtual reality. The system offloads computation to multiple servers to minimize the end-to-end latency, and includes a high-resolution mobile deep vision task acceleration system that offloads computation to multiple (edge located) servers.

BRIEF DESCRIPTION OF THE DRAWINGS

The features of the present disclosure will be apparent from the following Detailed Description, taken in connection with the accompanying drawings, in which.

DETAILED DESCRIPTION

Figure 1A:
FIGS. 1A-1B are images illustrating two image partitioning techniques, including equal partitioning (FIG. 1A) and ideal partitioning (FIG. 1B)
Figure 1B:

The present disclosure relates to computer vision systems and methods for acceleration of high-resolution mobile deep vision with content-aware parallel offloading, as discussed in detail below in connection with FIGS. 1-21. The systems and methods disclosed herein (also referred to occasionally herein and in the drawings as the "Elf" system) provides innovative technology to accelerate mobile deep vision applications (e.g., video surveillance and autonomous driving). It works by reducing computational load by parallel offloading to multiple edge servers better suited for the work.

As discussed in greater detail below, the system partitions an inference task into multiple pieces, is aware of the computation resources available to each server, partitions the pieces efficiently, and is designed so that it is independent of its host vision application. In order to partition the deep vision job into multiple pieces, Elf uses a recurrent region proposal prediction algorithm with an attention-based LSTM network. A region proposal indexing algorithm is used to keep track of the partitioned frames. Moreover, Elf uses a lightweight approach to estimate free capacity of each server in order to achieve load balance. Elf requires little modification at the application level meaning it can be used as a simple plug-and-play extension to any deep vision application.

The systems and methods of the preset disclosure are extremely useful when used to accelerate convolutional neural network (CNN) models that carry out a variety of challenging computer vision tasks with high resolution images or video (1920×1080). These tasks include image segmentation, multi-object classification, and multi-person pose estimation. When done on mobile devices, these applications are computation intensive and run at low frame rates. The systems and methods herein deal with this challenge by effectively partitioning and efficiently offloading work to multiple edge servers with low latency and high accuracy. In order to achieve a more ideal partitioning, the system uses a recurrent regional proposal prediction algorithm that predicts region proposals based on the one's detected historically. With this list of predicted region proposals, the system then partitions the frame into larger "RP boxes." These "RP boxes" are then offloaded to proper edge servers for partitioning. Server resource availability will be assessed during offloading. The edge servers will then run application specific CNN models to create partial results. These partial results are then integrated at the mobile side to yield the final result. The system provides a valuable approach to efficiently and accurately conduct computer vision tasks on mobile devices. As such, it is useful in tasks that handle high resolution images or videos on mobile devices. Examples include image/video classification, image/video analysis, which is valuable in augmented reality/virtual reality applications, and image/video identification applications that used in many industries (including, but not limited to, games, automotive/robots (autonomous), video surveillance to identify relevant objects, augmented and virtual reality, health care imaging, infrastructure hardware/software providers, autonomous vehicles/mobile robots, smart cities, and others.

The systems and methods discussed herein offer a superior deep vision task acceleration system well suited for high resolution images that offloads computation to multiple edge servers to minimize latency and ensure accuracy. Distinguishing features of the system include:

1) The use of a recurrent region proposal prediction algorithm through an attention based LSTM to partition the image. A region proposal (RP) refers to a group of pixels containing at least one object of interest. When a new frame arrives, the system uses this algorithm to predict its region proposals based on RPs detected in historical frames. For objects that have never occurred before, the system uses a low resolution compensation (LRC) scheme to locate these new objects.

2) The system partitions the frame into RP boxes using this list of predicted RPs via regional proposal indexing. RP boxes are larger than RPs and consist of one or more RPs. RP boxes are adjusted to fit well to objects. The system then offloads the RP boxes efficiently to free edge servers.

3) The system is aware of server capacity and computation cost via passive resource profiling and RP area-based estimation. This ensures load balance among servers.

The systems and methods disclosed herein provide a framework to accelerate high-resolution mobile deep vision offloading in heterogeneous client and edge server environments, by distributing the computation to available edge servers adaptively. The system adopts three novel techniques to enable both low latency and high quality of service. To eliminate the accuracy degradation caused by the frame partitioning, a content-aware frame partitioning method is provided. It is promoted by a fast recurrent region proposal prediction algorithm with an attention-based LSTM network that predicts the content distribution of a video frame. Additionally, a region proposal indexing algorithm is provided to keep track of the motion across frames and a low resolution compensation solution to handle new objects when first appear. Both work jointly to help under-stand frame contents more accurately. Finally, the system adopts lightweight approaches to estimate the resource capacity of each server and dynamically creates frame partitions based on the resource demands to achieve load balance. Overall, the system is designed as a plug-and-play extension to the existing deep vision networks and requires minimal modifications at the application level.

The systems and methods disclosed herein target those applications that employ state-of-the-art convolutional neural network (CNN) models to conduct a variety of challenging computer-vision tasks from images or videos. Examples include image segmentation, multi-object classification, multi-person pose estimation, and many others. In general, those applications take an input image or video frame which is often of high resolution, e.g., 1920×1080 pixels, containing multiple objects, and perform a two-step processing task. First, they use CNN networks to extract feature maps from the input and generate region proposals (RPs) for every object. Each RP is a candidate region where an object of interest—for example, a cat or child—may appear. Second, they use a CNN network to evaluate each RP and output the fine-grained result such as the classified object type or the key body points of a person. These state-of-the-art CNN models are usually highly computation intensive and run at a low frame rate, e.g., from 0.5 to 10 frames per second (fps) even on a high-end GPU (e.g. NVIDIA TITIAN 1080Ti).

Offloading the inference tasks of CNNs onto an edge server is a promising approach to realizing the target applications on mobile devices. However, these existing task-offloading approaches are limited in two critical aspects. First, they only support task offloading to just one server, assuming that the server has sufficient resources to finish the offloaded task in time. However, a costly offloading server, for example, Intel Xeon Scalable Processors with Intel Deep Learning Boost or NVIDIA EGX A100, is usually shared by multiple clients and thus may not have sufficient resources to run a task. To demonstrate it, we profiled the computing latency of ResNet50. Each client runs on NVIDIA Jetson Nano with 802.11.ax and the server runs the model inference on an NVIDIA TITIAN V GPU. The computing latency goes up in a linear pattern from 25.9 ms to 162.2 ms when changing the number of concurrent clients from 1 to 4. To handle the latency burst, Amazon SageMaker adopts Kubeflow Pipelines to orchestrate and dynamically configure the traffic running on each server. However, this solution cannot handle resource fragmentation and may waste the computing cycles.

Another limitation of existing solutions is that they use low-resolution (e.g., 384×288) images or videos to make the inference task lightweight. However, cameras on today's mobile devices typically capture with a much higher resolution such as 2K and 4K. Such a big gap causes two problems. On one hand, those existing low-resolution solutions fail to leverage the rich information of high-resolution images and videos to enable advanced applications such as various video analytics, for example, smart intersection. Existing studies have already shown running object recognition related tasks on high-resolution images can largely increase the detection accuracy. On the other hand, supporting high resolutions requires more computations and further undermines the assumption that one server can provide sufficient resources for the entire application. It has been determined that the inference latency of MaskRCNN running on Jetson TX2 boosts by 25%, 50% and 300% with increasing the image resolution from 224×224 to 1K, 2K and 4K, respectively, making the offloading harder.

There are several key challenges in designing the systems and methods of the present disclosure. The first challenge lies in how to partition the computation. Broadly speaking, there are two approaches, model-parallel and data-parallel. Model parallelism, i.e., splitting a large model into multiple subsets of layers and running them on multiple servers, generates the large intermediate outputs from convolution layers which would lead to high communication overhead among servers. For example, the ResNet152 neural network produces the outputs with 19-4500× larger than the compressed input video. Data-parallelism can be explored by partitioning an input frame and offloading each frame partition to a different server. However, as shown in FIG. 1A, which illustrates an equal partitioning technique, the simple equal partitioning may not work because: (1) offloading a partition containing parts of an object may significantly reduce the model accuracy; and (2) offloading a partition containing no objects may lead to excessive waste. Instead, the systems and methods of the present disclosure develop a smart video frame partitioning scheme to generate the ideal image partitioning shown in FIG. 1B. As can be seen, the ideal partitions only include pixels having content likely to be of interest, while pixels of lower interest are ignored. Such a partitioning approach greatly increases computational efficiency and improves communications efficiency as only necessary information is transmitted to the edge computing systems for further computation.

The second challenge is how to distribute the tasks to multiple servers to minimize the total model inference latency. Ideally, all the servers should finish their tasks at the same time. However, that is hard to achieve because multiple dynamic factors must be considered together: the number of objects in the input images, the resource demand of processing each object, the number of servers and their available resources. Furthermore, another challenge is to minimize the workload of the resource-limited mobile device. In particular, the video frame partitioning is the step before offloading, running on the mobile device, and thus must be efficient and lightweight.

Figure 2:
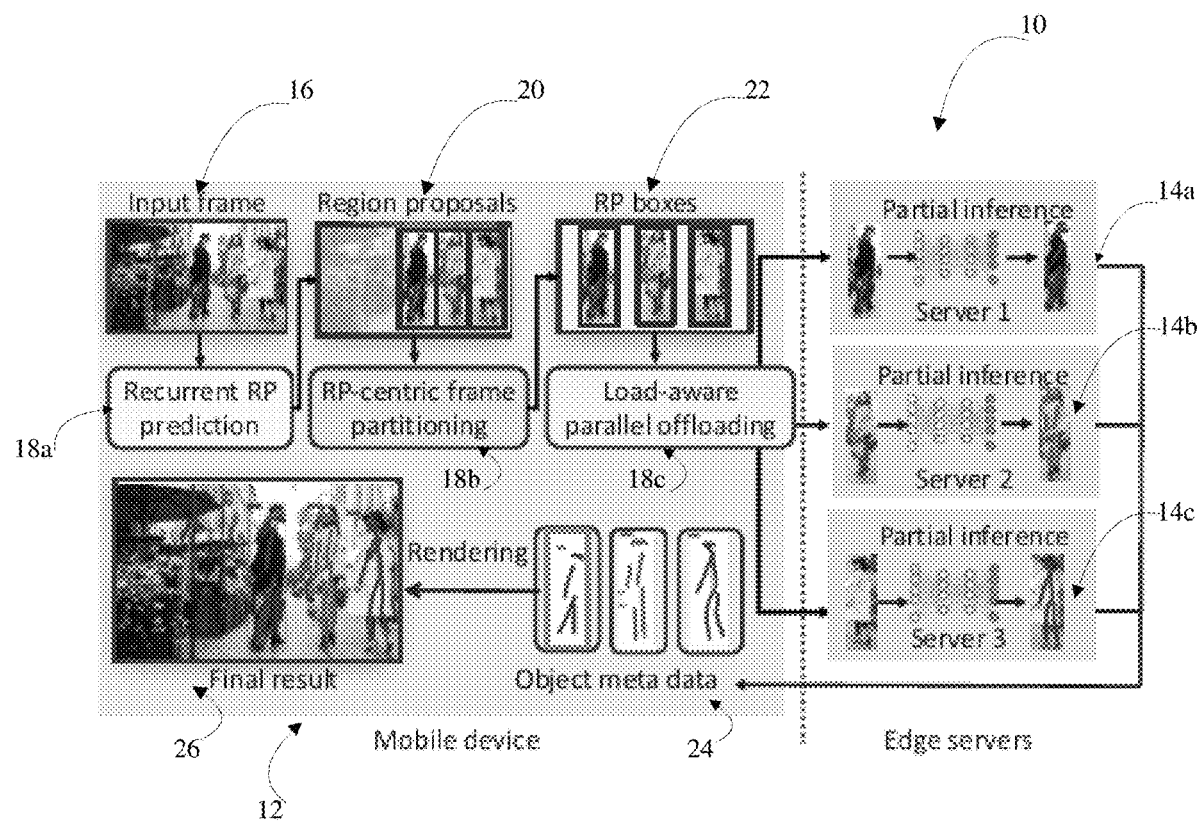
FIG. 2 is a diagram illustrating hardware and software components in accordance with systems and methods of the present disclosure.

FIG. 2 is a diagram illustrating hardware and software components of the system of the present disclosure, indicated at 10. The system includes a mobile device 12 (which could include a smart telephone, a portable computing device, or other computing device having sufficient computing capabilities to carry out the processes discussed herein) in communication with one or more edge servers 14a-14c via appropriate network connections (e.g., wired network connections, wireless network connections, WiFi connections, Bluetooth connections, cellular data network connections (e.g., 4G or 5G data connections), optical networking connections, or other types of network connections). The mobile device 12 includes a plurality of software modules 18a-18c that are stored in memory of the mobile device 12 (e.g., in one or more non-transitory storage memories, such as flash memory, non-volatile memory, disk memory, random-access memory, etc.). The module 18a is a recurrent region-proposal (RP) prediction module which receives and processes an input frame 16 (which could be a live image captured by a camera or other sensor of the mobile device 10) and generates RP predictions (e.g., one or more regions where data of interest may exist). The RP predictions 20 generated by the module 18a are then processed by an RP-centric frame partitioning module 18b which partitions the input frame 16 along the RP predictions 20 to generate RP boxes 22. The RP boxes 22 are then processed by a load-aware parallel offloading module 18c which offloads (transmits) the RP boxes to one or more of the edge servers 14a-14c for further processing. The edge servers 14a-14c perform one or more computer vision processes on the RP boxes 22 (e.g., using one or more neural network or other computer vision processes) to generate object metadata 24, which is then transmitted to the mobile device 12. The mobile device 12 then combines the object metadata 24 with the input frame 16 to produce a final result 26 which can be displayed to the user. As can be seen, the final result 26 could be an augmented reality (AR) image that shows both the input frame 16 as well as one or more indicia superimposed thereon that indicates the presence of objects in the image frame 16 (in the case of FIG. 2, the final result 26 includes AR indicia indicating the three persons present in the input image frame 16).

Whenever a new video frame arrives, the module 18a predicts region proposals based on the ones detected in historical frames. The prediction reports each region proposal's coordinates. Here, a region proposal (RP) refers to a group of pixels containing at least one object of interest, e.g., a vehicle or a pedestrian. Given the list of predicted RPs, the module 18b partitions the frame into the RP boxes 22. All the RP boxes 22 collectively cover all the RP pixels while discarding background pixels that are un-likely to contain RPs. The module 18c then offloads these partitions to proper edge servers 14a-14c for processing. Both partitioning and offloading consult the partition's resource demands and server resource availability. Taking the offloaded partitions as input, the edge servers 14a-14c run the application-specific CNN models to yield partial inference results. These partial results are finally integrated at the mobile side (on the mobile device 12) to render the final result.

We adopt the following guidelines to devise the recurrent RP prediction algorithm executed by the module 18a: (1) the algorithm is lightweight; (2) the algorithm can effectively learn the motion model of the objects/RPs from history frames; and (3) the algorithm pays more attention to more recent frames. Here, a well-designed algorithm can accurately predict the RP distribution and help minimize the impact of the frame partitioning upon the deep vision applications' model accuracy. Following the guidelines above, we devised an attention-based LSTM network for recurrent RP prediction. Note that the mainstream RP prediction/tracking algorithms require large CNN models. Instead, our approach efficiently utilizes the historical RP inference results and converts the computing-intensive image regression problem to a light-weight time series regression problem. As part of the prediction algorithm, we also develop an RP indexing algorithm that keeps track of the motion across frames. Finally, we also propose a Low Resolution Compensation scheme to handle new objects when they first appear.

Partitioning by the module 18b of a video frame allows the module 18c to offload each partition to a different edge server 14a-14c for parallel processing. Ideally, a well-designed frame partitioning scheme should show a negligible overhead and have heterogeneous edge servers to finish parallel inference tasks at the same time. Keeping these goals in mind, we designed an RP-centric approach with the following guidelines. First, the partitioning algorithm should be aware of the number of and locations of RPs in a frame and be inclusive. Also, the module 18b discards background pixels that are un-likely contain any RPs. Based on prior studies, the area percentage of background in the validation set takes up to 57%. Removing them can significantly reduce the computing and network transmission costs.

Second, depending upon the objects contained in each partition, partitions have different computation costs. For example, it usually involves different numbers of pixels and becomes more challenging to identify multiple overlapping vehicles with similar colors than identifying a single vehicle with early-exit CNN models. The algorithm executed by the module 18c therefore takes into consideration this cost heterogeneity to achieve load balancing among the servers 14a-14c.

After partitioning, the module 18c next matches these partitions to a set of edge servers 14a-14c. Unlike central clouds, edge cloud servers exhibit heterogeneous computing/storage/networking resources due to the distributed nature and high user mobility. This makes the matching problem even more challenging. A poor match may result in job stragglers that complete much slower than their peers and thus significantly increases the overall latency.

When a new frame arrives, the module 18a predicts the coordinates of all the RPs in the frame 16, based on the RPs in the previous frames. In this section, we present three components that are key to achieve fast and effective RP prediction: an attention-based LSTM prediction network, a region proposal indexing algorithm, and a low-resolution frame compensation scheme. We choose to use attention-based LSTM for its powerful capabilities of learning rich spatial and temporal features from a series of frames. Also, it incurs a low system overhead of 3-5 ms running on mobile devices.

As the objective is to train the attention-based LSTM network for acquiring the RP predictions accurately, the optimization process could be mathematically expressed as:

$$\min_\theta \mathcal{L}(\hat{R}_i^t, R_i^t) = \min \sum_i [(\hat{x}_{i,tl}^t - x_{i,tl}^t)^2 + \quad (1)$$
$$(\hat{y}_{i,tl}^t - y_{i,tl}^t)^2 (\hat{x}_{i,br}^t - x_{i,br}^t)^2 + (\hat{y}_{i,br}^t - y_{i,br}^t)^2 + (\hat{a}_i^t - a_i^t)^2]$$
$$\text{s.t. } \hat{R}_i^t = f(\{R_i^{t-N}, R_i^{t-N+1}, \ldots, R_i^{t-1}\}, \theta)$$

where the vector $R_i^t$ denotes the i-th ground-truth RP at frame t, and $\hat{R}_i^t$ is the predictive RP counterpart. Both $R_i^t$ and $\hat{R}_i^t$ consist of $[x_{tl}, y_{tl}, x_{br}, y_{br}, a_i]$ as the x, y coordinates of RP's top-left and bottom-right corners, and the area, respectively. $\theta$ is the model parameters of LSTM. Also, $a_i^t$ is the RP's area calculated based on $x_{tl}$, $y_{tl}$, $x_{br}$, and $y_{br}$. Further, N is the number of previous frames used in the prediction network $f(\bullet)$. Next, we explain our algorithmic effort in minimizing the prediction error as calculated in Equation (1).

Figure 3:
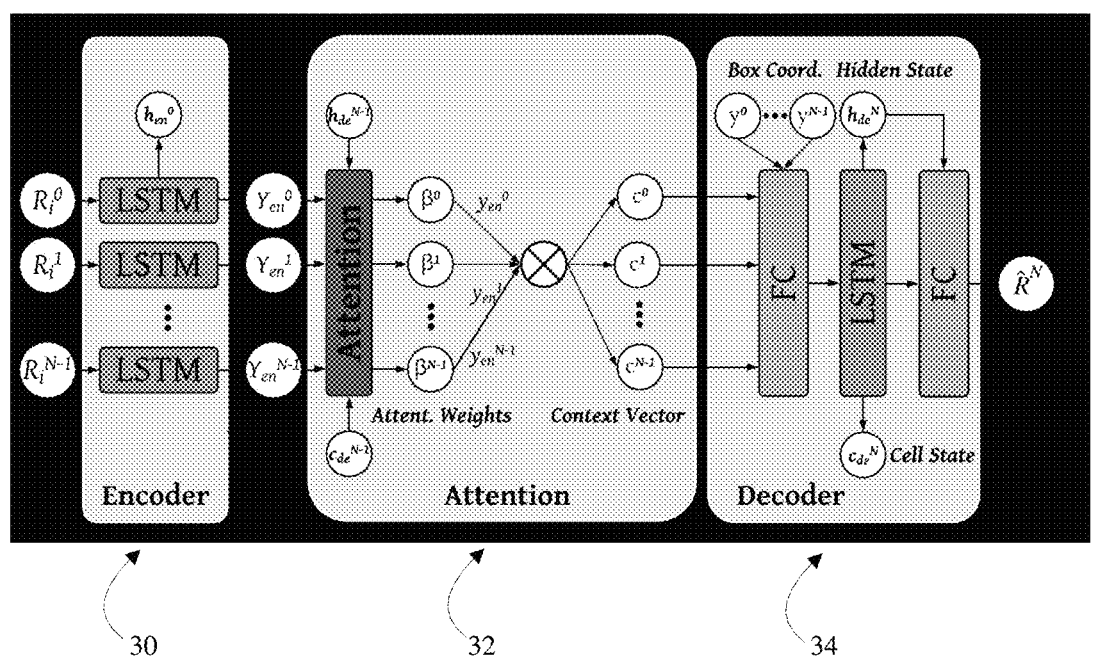
FIG. 3 is a diagram illustrating encoding, attention processing, and decoding functions carried out by the systems and methods of the present disclosure.
Figure 4:
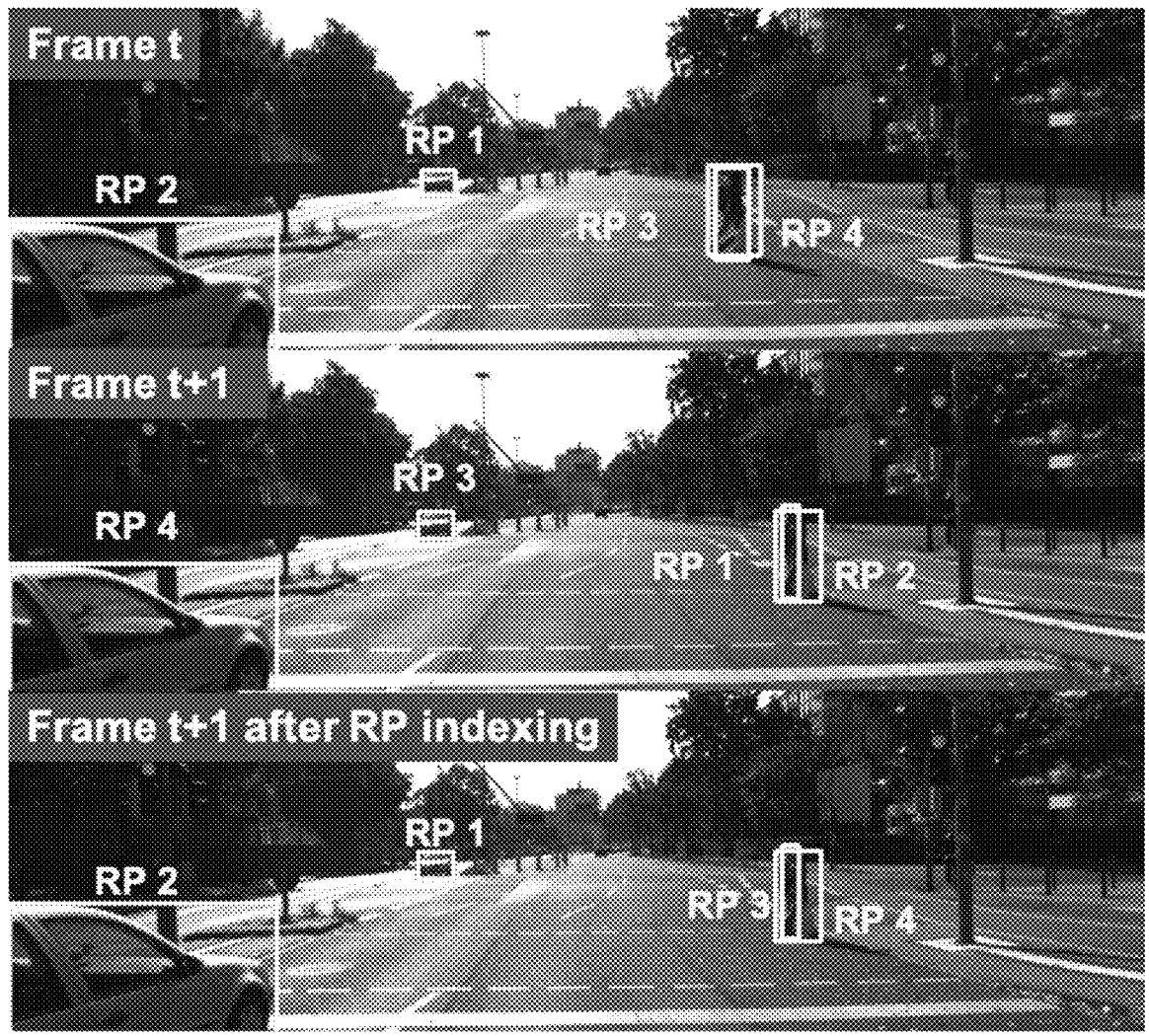
FIG. 4 illustrates region proposal and indexing processes carried out by the systems and methods of the present disclosure in connection with a sequence of image frames.

Recently, attention-based RNN models have shown their effectiveness in predicting time series data. Because of this, the system adapts a dual-stage attention-based RNN model, and develops a compact attention-based LSTM network for RP predictions. Note that adopting an LSTM based model rather than RNN can help detect periodically repeated patterns appeared in historical frames. As shown in FIG. 3, the system includes three modules—an encoder 30, an attention module 32, and a decoder 34.

To predict the i-th RP in the current frame, the encoder 30 takes the spatial and temporal information (i.e., the RP's locations in history frames) of the i-th RP from N past frames $R_i^t \in R^{5\times 1}$ as input, and encodes them into the feature map $\{Y_{en}^t\}$, $t \in \{0, \ldots, N-1\}$. This encoding is conducted by a two-layer LSTM, which can be modeled as:

$$Y_{en}^t = f_{en}(Y_{en}^{t-1}, R^t), \quad (2)$$

where $f_{en}(\bullet, \bullet)$ denotes the LSTM computation.

Subsequently, the attention module 32 is executed, which is a fully-connected layer to select the most relevant encoded feature. The first step is to generate the attention weight β:

$$l_i^t = W_2 \tanh(W_1[Y_{en}; c_{de}^{N-1}; h_{de}^{N-1}]) \quad (3)$$

$$\beta^t = \frac{\exp(l_i^t)}{\sum_{j=T-N-q}^{T} \exp(l_j^t)} \quad (4)$$

where $[Y_{en}; c_{de}^{N-1}; h_{de}^{N-1}]$ is a concatenation of the encoder output $Y_{en}$, decoder cell state vector $c_{de}^{N-1}$ and decoder hidden state vector $h_{de}^{N-1}$. W1 and W2 are the weights to be optimized. The intermediate attention weight is applied with softmax function to obtain the normalized attention weight β. Thereafter, the context vector can be computed as:

$$c^t = \sum_{j=0}^{N-1} \beta_j^t Y_{en} \quad (5)$$

which captures the contributions of encoder outputs.

The decoder module 34 processes the context vector through a fully connected layer, an LSTM model, and a fully-connected regressor.

To precisely predict a region proposal, we need to collect historical data, which provides necessary information such as motion models and trajectories. However, many vision applications commonly output object labels in random order. Thus, it is hard to match and track region proposals across frames. For example, references is made to the example illustrated in FIG. 4, where the same RPs in consecutive frames have different labels. To address this issue, a light consistent RP indexing algorithm (listed in Algorithm 1, below and executed by the module 18a) was developed. Vision-based matching algorithms are not considered because they introduce significant overheads in hundreds of milliseconds. From the very first video frame, the module 18a assigns a unique index to each region proposal. In each upcoming frame, the module 18a matches each RP with the corresponding index assigned earlier. If an RP includes a new object that was not seen before, a new index will be automatically assigned.

---

Algorithm 1 Region Proposal Indexing

Require: RP $R_i^{t-1} = [x_{tl,i}^{t-1}, y_{tl,i}^{t-1}, x_{br,i}^{t-1}, y_{br,i}^{t-1}]$ for object i in frame t − 1, where i∈ [0, 1, . . . , $m^{t-1}$] and $m^{t-1}$ is number of objects in frame t − 1. Label set is L.
Ensure: For frame at t, assign an index to each region proposal $R^t$.
  {Step-1. Initialization:}
1: if t < N then ▷ label with a consistent index
2:   $R_i^t[5] \leftarrow l_i^t$, $l_i^t \in L$; $\forall i \in [0, 1, \ldots, m^{t-1}]$
3: end if
  {Step-2. Measure distance and area:}
4: for i := 1 to $m^{t-1}$ do
5:   for k := 1 to $m^t$ do
6:     $D_{i,k}^x \leftarrow |(x_{tl,i}^{t-1} + x_{br,i}^{t-1}) - (x_{tl,k}^t + x_{br,k}^t)|/2$ ▷ x-axis.
7:     $D_{i,k}^y \leftarrow |(y_{tl,i}^{t-1} + y_{br,i}^{t-1}) - (y_{tl,k}^t + y_{br,k}^t)|/2$ ▷ y-axis.
8:     $A_{i,k} \leftarrow \left|1 - \frac{(x_{br,i}^{t-1} - x_{tl,i}^{t-1})(y_{br,i}^{t-1} - y_{tl,i}^{t-1})}{(x_{br,k}^t - x_{tl,k}^t)(y_{br,k}^t - y_{tl,k}^t)}\right|$ ▷ Area -continued Algorithm 1 Region Proposal Indexing

```
 9:     end for
10:   end for
      {Step-3. Match and label:}
11:   for k := 1 to m^t do
12:     î ← arg min_i {A_{i,k}}_{i=0}^{m^{t-1}}; s.t. D_{i,k}^x < 0.02, D_{i,k}^y < 0.02, A_{i,k} < 0.2
13:     if î is not None then
14:       R_k^t[5] = R_î^{t-1}[5]     ▷ label with matched RP
15:     else
16:       R_k^t[5] = l_k^t, l_k^t ∈ L   ▷ new label for unmatched
17:     end if
18:   end for
```

Here, Algorithm 1 matches the RPs across frames with a combination of RP position shift and RP area shift. The RP position shift measures the change of the center point along the x-/y-axis between the current frame and the previous frame, as specified by Lines 6 and 7 in Algorithm 1. A larger value indicates a bigger spatial shift and thus a lower matching probability. The RP area shift measures the amount of area change between the RPs in two adjacent frames, as specified by Line 8 in Algorithm 1. A lower value indicates a higher matching probability. When the x and y RP position shift are both under 0.02 and the area shift ratio is under 0.2, a match is declared. The thresholds have been selected because they generate the lowest prediction loss in the evaluation. The sum of the RP position shift and RP area shift will be taken as an additional metric when there exist multiple RPs simultaneously satisfying the above threshold requirement.

Figure 5:
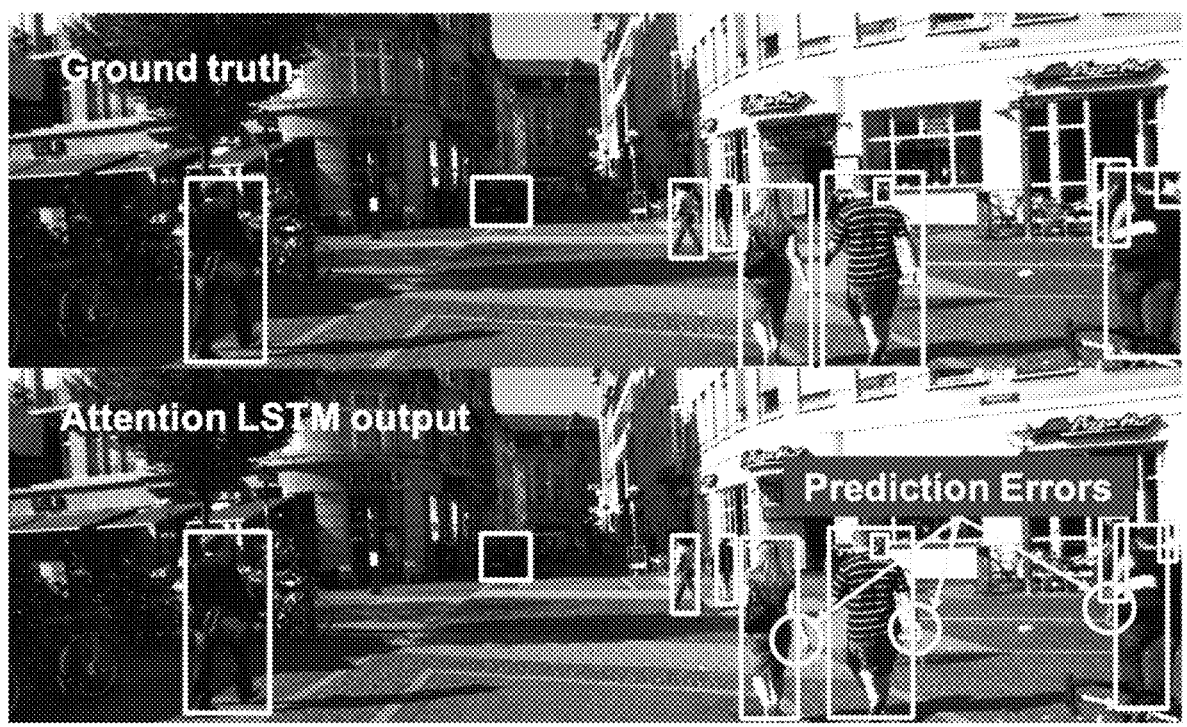
FIG. 5 illustrates long-short term memory (LSTM) outputs and prediction errors in comparison to ground truth data.

Another challenge in RP prediction lies in the possibility that the predicted RP bounding box may not cover all the pixels of an object due to motion. For example, as shown in FIG. 5, the predicted bounding box excludes the person's hands (indicated by the circles labelled "Prediction Errors" in FIG. 5), which will affect the object detection performed on the edge server. To address this challenge, the bounding box was carefully expanded by p %. The downside of this scheme is the increased data transmission and computation. In this regard, a trade-off study is discussed in more detail below. Here, the module 18a adopts different strategies to dynamically configure the value of p for different RPs. In particular, it consults the corresponding RP position shift and the prediction confidence level as the indicators to assign different weights on p.

Figure 16:
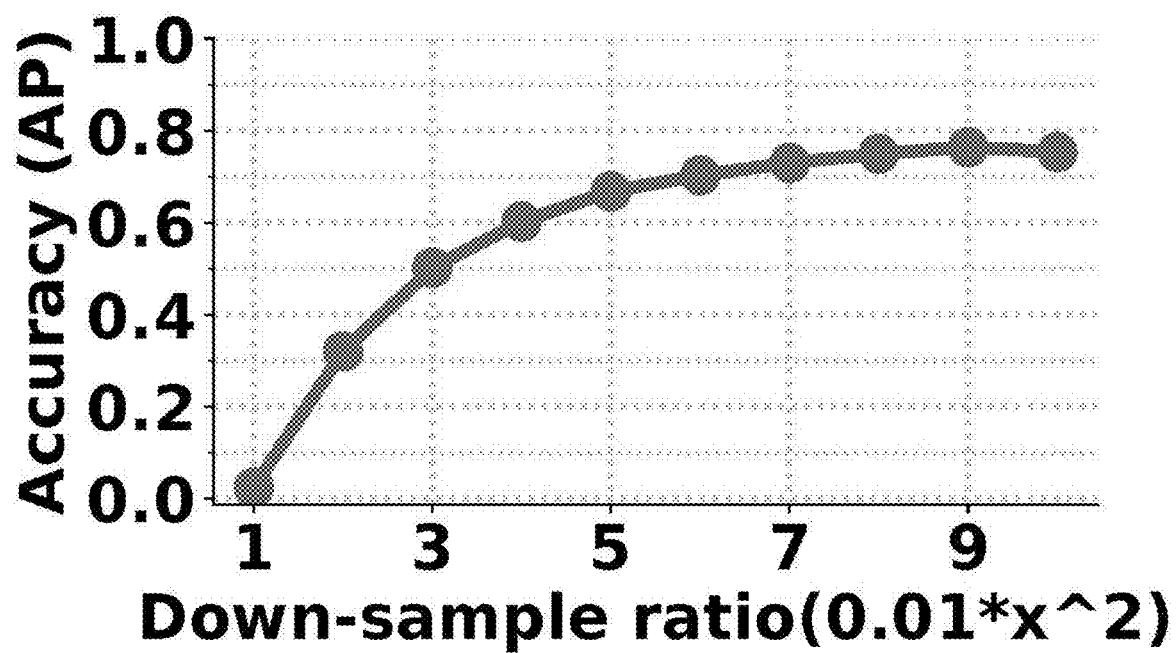
Figure 17:
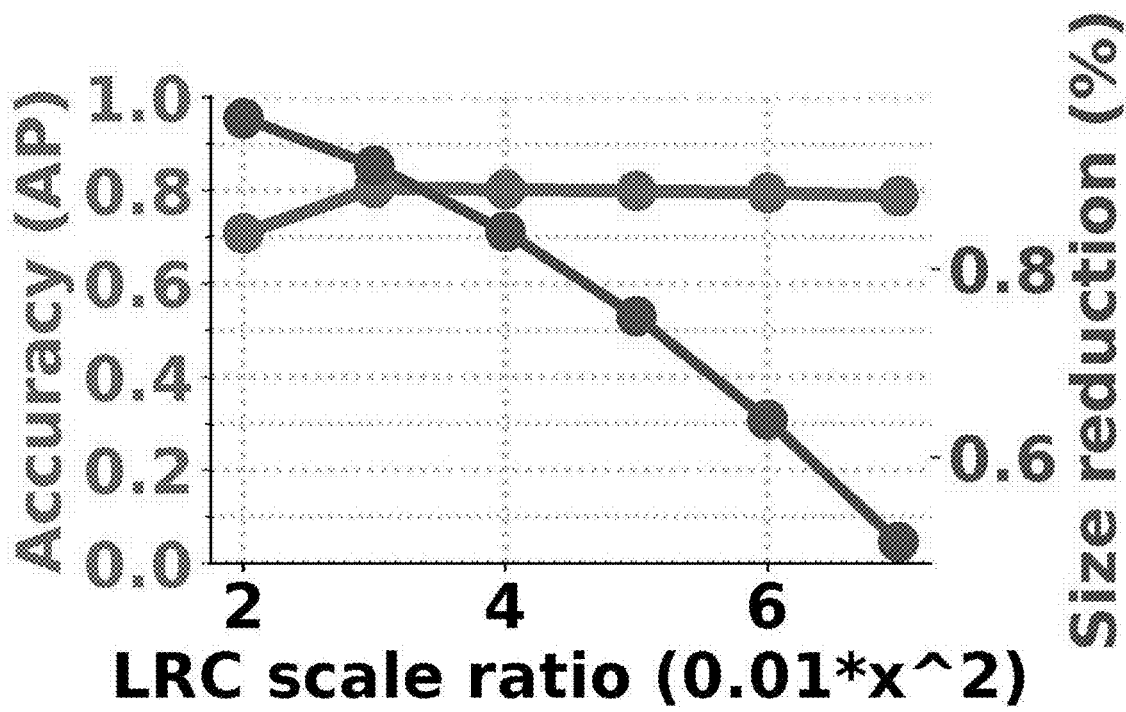

The above attention LSTM-based prediction can deal with only the objects that already occurred in the previous frame, but not new ones never seen before. Accordingly, discussed herein are ways how to handle the new objects when they appear for the first time in a frame. To handle new objects, a low resolution compensation (LRC) process is implemented with a balanced trade-off between computation overhead and new-object detection accuracy. Importantly, while inference with the down-sampled frame cannot produce fine-grained outputs that are required by the applications, such as object masks or key body points, we find that inference with down-sampled frames can still detect the presence of objects. FIGS. 16-17 validate this observation. To reduce the computation overhead, LRC down-samples a high-resolution video frame by a max-pooling operation. The module 18c then offloads the resized video frame, along with the partitions from regular sized partitions, to edge servers to run application-specific models, which usually consist of an object detection component. Based on the inference results, the system can roughly locate the new objects in the frame.

The same application-specified deep learning neural networks in the LRC module can be used even though it may lead to a higher computation overhead than some lightweight networks. In this way, there is no compromising of the new object detection accuracy. Meanwhile, the system runs LRC once per n frames to reduce such an overhead. n is a hyperparameter, indicating the trade-off between computation cost and at most n-frame delay to realize new objects.

Based on the RP predictions, module 18b partitions a frame into multiple pieces, focusing on regions of interest while removing unnecessary dummy background pixels. Video frame partitioning plays a dominant role in minimizing the offloading traffic and balancing workloads across edge servers 14a-14c.

The system 10 takes the following items as input: (i) video frame $F_t$ at time t, (ii) the list of RP predictions in which $R_i^t$ denotes the i-th RP in frame $F_t$, with i∈[1, . . . , M] and M as the total number of RPs, and (iii) the available resource capacity, with $p_j^t$ denoting the available resource capacity of the j-th server (j∈[1, . . . , N]) at time t. Based on the input, the system packs the M RP processing tasks and one LRC task into N' offloading tasks (N'≤N), and offloads each task onto an edge server.

The overall objective of the partitioning and the offloading process is to minimize the completion time of the offloading tasks that are distributed across N' edge servers. In other words, minimizing the completion time of the task which has the longest execution time among all the tasks. It is assumed that the mobile device 12 only has access to a limited number of servers 14a-14c and that we try to make full use of these servers to minimize the application's completion time.

Accordingly, the optimization objective can be written as:

$$\min \max(\{T_k^t\}) \quad k \in [1, \ldots, N'], \quad (6)$$

$$\text{s.t. } T_k^t = T_{rps,k}^t + T_{lrc,k}^t \cdot 1_{(mod\ n=0)} \cdot 1_{(argmax[p^t]=k)},$$

$$T_{rps,k}^t \approx \frac{C_{rps,k}^t}{p_k^t}, \quad T_{lrc,k}^t \approx \frac{C_{lrc,k}^t}{p_k^t}$$

where $T_k^t$ denotes the completion time on the k-th server[3] at time-t. $T_k^t$ consists of two completion-time terms, $T^t$ and $T_{rps,k}^t$, for RPs and LRC respectively. $1_{condition}$ returns 1 if and only if the condition meets, otherwise returns 0. Further, $C_{rps,k}^t$ and $C_{lrc,k}^t$ are the computing cost of RP box and LRC offloading to server k, which will be described in Equation (8).

Figure 9:
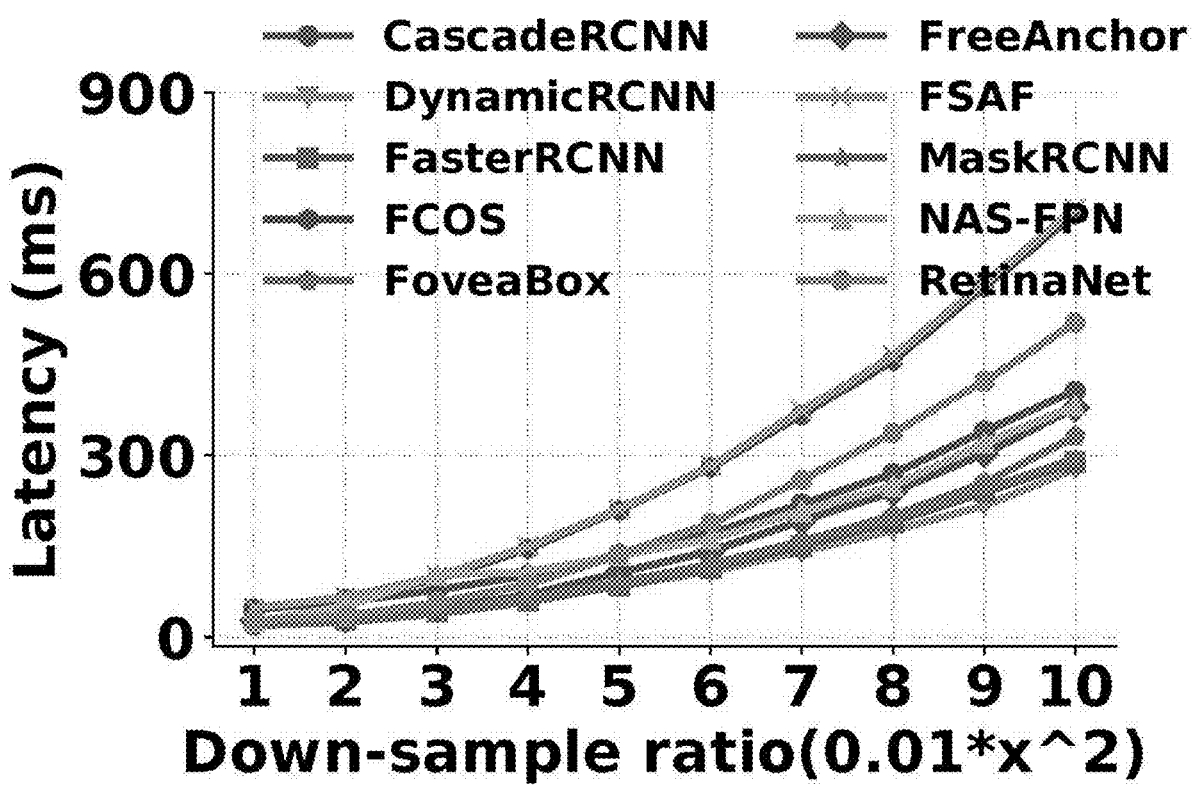

After predicting the list of RPs, a straightforward scheduling approach is to cut out all the RPs and individually schedule each RP processing task onto edge servers 14a-14c. While this sounds intuitive in many domains, it may not work the best for deep vision tasks due to the potential fragmentation problem. First, the execution time of r (r is a small number such as 2 and 3) small RP (e.g., <5% size of the original image) tasks is not much less than r times of the execution time of running a single r-fold RP task. For example, FIG. 9 shows that a frame with resizing into 1%, 4%, 9% takes 35.19 ms, 37.9 ms, and 44.24 ms, respectively, to run the MaskRCNN inference. This is because in most deep vision models, except for the part extracting feature maps, the rest of the network is usually the same regardless of the size of the input. Second, it is hard to determine a good cropping strategy. On one hand, the precise cut-out individual RPs will lead to poor detection inference accuracy due to the lack of necessary background pixels; on the other hand, if we leave large padding around the RPs, then the total offloaded data will be too large to be efficient. Third, too many cropping operations generate high memory copy overheads which may likely become problematic on mobile devices.

Given the above observations, the system utilizes an RP scheduling method that is more content- and resource-aware than the above naive counterpart. The key data structures here are the RP boxes 22 shown in FIG. 2. Compared to a single RP, an RP-box is larger and consists of one or more nearby RPs, as illustrated in graph (f) of FIG. 6, with 4 RPs and 3 RP boxes. The number of offloading tasks is determined by the number of available edge servers. Each offloading task consists of either an LRC task, or an RP-box processing task, or both. Scheduling an RP box instead of individual RPs, we can avoid the fragmentation problems mentioned above.

Before partitioning a frame, module 18b first crops the area with all the RPs and horizontally partitions it into N segments (N is #available servers), where each segment corresponds to an initial RP box. The size of each RP box is initialized to be proportional to the available resource of the corresponding server, as depicted in graph (b) of FIG. 6, which is the first effort to achieve load balancing. Here, we explain how the LRC task scheduling interferes with the RP box scheduling. Note that, the LRC task is only available every n frames ($1_{(t\ mod\ n=0)}$ in Eq. (6)). At the LRC round, we partition the cropped image into (N−1) segments and have (N−1) RP boxes accordingly. We reserve one of the servers 14a-14c for the LRC task. Regardless of the number of RP boxes, the scheduling algorithm works the same—during the LRC round, we treat the LRC task the same as another RP box processing task. Below, without the loss of generality, we assume there are N RP boxes.

Thereafter, each RP is associated with an RP box. For each RP, the system evaluates its spatial relationship with all the RP boxes. Given a pair of RP r and box b, their spatial relationship falls into one of the three cases:

Inclusion: In this case, r is completely included in b and conveniently associated.

No-overlap: In this case, r is not associated with b.

Partial-overlap: In this case, r intersects with b. Meanwhile, it partially overlaps with at least one other box as well. Here, we choose to associate with the RP box that has the most overlap with the RP. If there is a tie, we choose the RP box with a larger gap between the server resource capacity and the computation costs of the RPs that are already associated. This association solution is the second effort to achieve load balancing.

Figure 6:
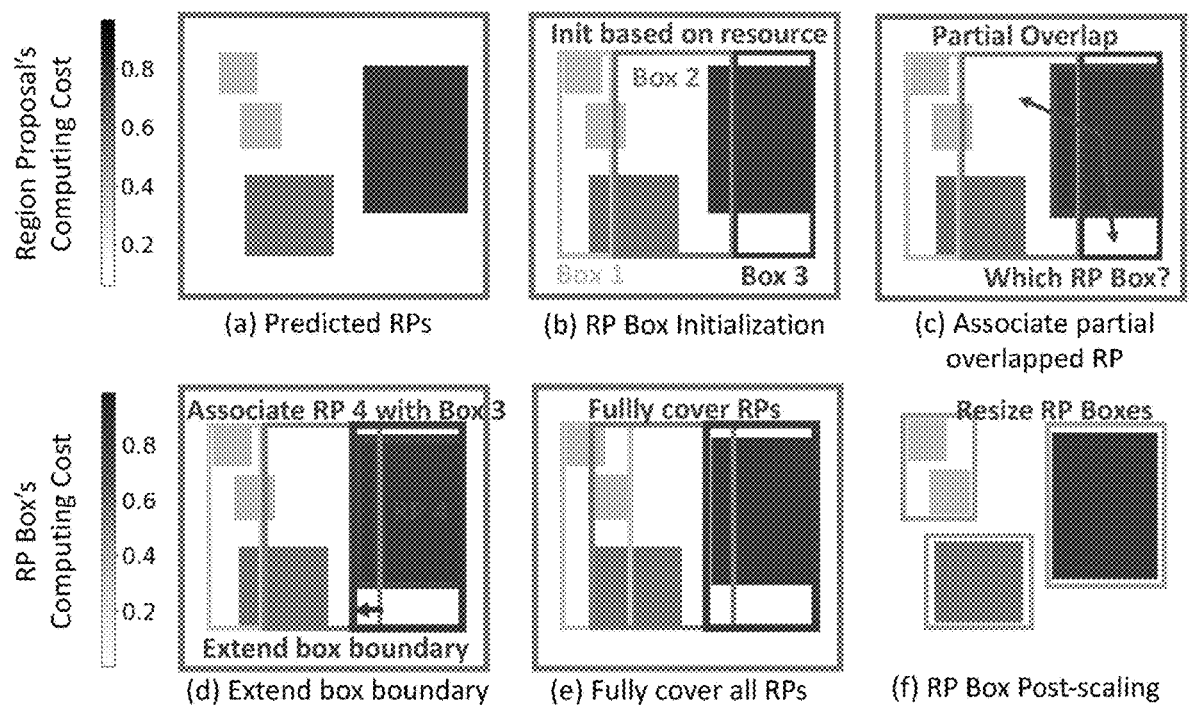
FIG. 6 illustrates computing costs associated with various region proposals generated by the systems and methods of the present disclosure.

The system applies the association steps to all the RPs as shown in graphs (c) and (d) of FIG. 6.

After all the RPs have been associated with a box, the system resizes each RP box such that it can fully cover all the RPs that are associated with it. This is illustrated in graphs (e) and (f) of FIG. 6. After this adjustment, the computation cost of some RP boxes may drastically increase compared to the initialization stage and thus break the intended load balancing. To avoid this, we examine those RP boxes whose cost increase exceeds a pre-defined threshold (we discuss below how to estimate an RP box's computation cost). For these boxes, the associated RPs are sorted ascendingly with respect to the computation cost. We try to re-associate the first RP on the list (the one with the lowest cost) to the neighboring box who has enough computation capacity to hold this RP. After each reassociation, the two boxes need to adjust their sizes accordingly and estimate the new computation cost. We repeat this re-association process as far as the load distribution is becoming more even. We stop this process if the re-association results in an even higher load imbalance. Here, we formally evaluate the load-balanced situation by:

$$\Theta = \text{Var}(\{T_k^t\}) \qquad (7)$$

where Θ denotes the variance of the estimated execution time of all the tasks. A smaller Θ denotes a more balanced partitioning and offloading. We can calculate $T_k^t$ by the following Equation (6) where $C^t_{rps,k}$ and $C^t_{lrc}$ can be found as:

$$C^t_{rps,k} = \sum_v \{C^t_{rp,v}\},\ C^t_{lrc} = \alpha \cdot \left( \sum_{k=1}^M C^t_{rps,k} \right) \qquad (8)$$

where α is the LRC down-sample ratio.

Finally, module 18c simultaneously offloads each RP box and the LRC task (if available in that round) to the corresponding edge server and executes the application-specific models in a data-parallelism fashion. In this subsection, we describe how the module 18c estimates the server resource capacity and each RP's computation cost.

The module 18c considers two ways of estimating a server's resource capacity. The first approach is through passive profiling. It calculates server m's current end-to-end latency as the average latency over the last n (default value of 7) offloading requests that are served by m. Then the resource capacity is defined as 1/Tm. This passive profiling can reflect both computing and network resources. The second approach is through proactive profiling: Elf periodically queries the server for its GPU utilization.

The module 18c also considers two ways of estimating an RP's computation cost. The first approach is based on the RP's area, assuming the cost is linearly proportional to the RP area. The second approach is through Spatially Adaptive Computation Time (SACT). Here, we briefly explain how to borrow its concept to estimate the computing cost of RPs. SACT is an optimization that early stops partial convolutional operations by evaluating the confidence upon the outputs of intermediate layers. Overall, SACT indicates how much computation has been applied with each pixel of a raw frame input. Module 18c can accordingly estimate the cost of an RP at the pixel level. To adopt this approach, we need to slightly modify the backbone network as instructed in. We adopt the passive resource profiling and RP area-based estimation in the implementation as they are more friendly to Elf's users and require less system maintenance efforts.

A prototype of the system 10 was implemented in both C++ and Python for easy integration with deep learning applications. Also, we wrap the C++ library with Java Native Interface (JNI) to support Android applications. In total, our implementation consists of 4,710 lines of codes. Our implementation is developed on Ubuntu16.04 and Android10. We integrate ZeroMQ4.3.2, an asynchronous messaging library that is widely adopted in distributed and concurrent systems, for high-performance multi-server offloading. We use NVIDIA docker to run offloading tasks on edge servers. We also wrap nvJPEG with Pybind11 for efficient hardware-based image/video encoding on mobile devices.

The system 10 is designed and implemented as a general acceleration framework for diverse mobile deep vision applications. We aim to support existing applications with minimal modifications of applications. The required modifications only focus on the DNN inference functions. Here, we assume that an application can separate the DNN inference from the rest of it. Thus, the other parts and the internal logic of applications remain the same. Specifically, the host deep learning models need to implement two abstract functions:

1. def cat(instance_lists: List["Instances"])→"Instances",
2. def extract(instance:Instances)→"List["RP"]".

The system employs the first API to aggregate the partial inference results, and the second API to extract RPs from the data structure of partial inference results to be used in the RP prediction. With these two APIs, the system can hide its internal details and provides a high-level API for applications:

3. def run(img:numpy.array)→"Instances",

This API can make the inference function as same as the one running locally, while the system can run multi-way offloading and feed the merged results to applications. By following the above approach, we successfully integrate the system with ten state-of-the-art deep learning models reported below.

The system's functions should run on mobile devices but not edge servers for two reasons: (1) finishing both functions locally enables to offload less than 50% data as redundant background pixels will be removed; and (2) all of the functions only take 5-7 ms on mobile devices, and thus the offloading benefit will be trivial considering much fewer data to ship.

We successfully integrated the system with ten state-of-the-art deep learning networks and thoroughly evaluated the system in the following three typical applications: instance segmentation, multi-object classification and multi-person pose estimation. The results of such testing, including various performance characteristics associated with the testing of the system, are illustrated in FIGS. 8-21 and discussed below. Our results show that the system can accelerate the inference up to 4.85× and 3.80× on average with using 52.6% less band-width on 4 edge servers while keeping the inference accuracy sacrifice within 1%.

We use four mobile platforms: Google Pixel4 (Qualcomm Snapdragon 855 chip consisting of eight Kryo 485 cores, an Adreno 640 GPU and a Hexagon 690 DSP), (2) Nexus 6P (Snapdragon 810 chip with four ARM Cortex-A57 cores and four ARM Cortex-A53 cores, an Adreno 430 GPU), (3) Jetson Nano [37] (Quad-core ARM Cortex-A57 MP-Core CPU, NVIDIA Maxwell GPU with 128 CUDA cores), and (4) Jetson TX2 [42] (Dual-Core NVIDIA Denver 2 64-Bit+ Quad-Core ARM Cortex-A57 MPCore CPU, NVIDIA Pascal GPU with 256 CUDA cores). The evaluation results with Jet-son TX2 have been reported if not explicitly stated otherwise study the performance difference of mobile devices.

Figure 7:
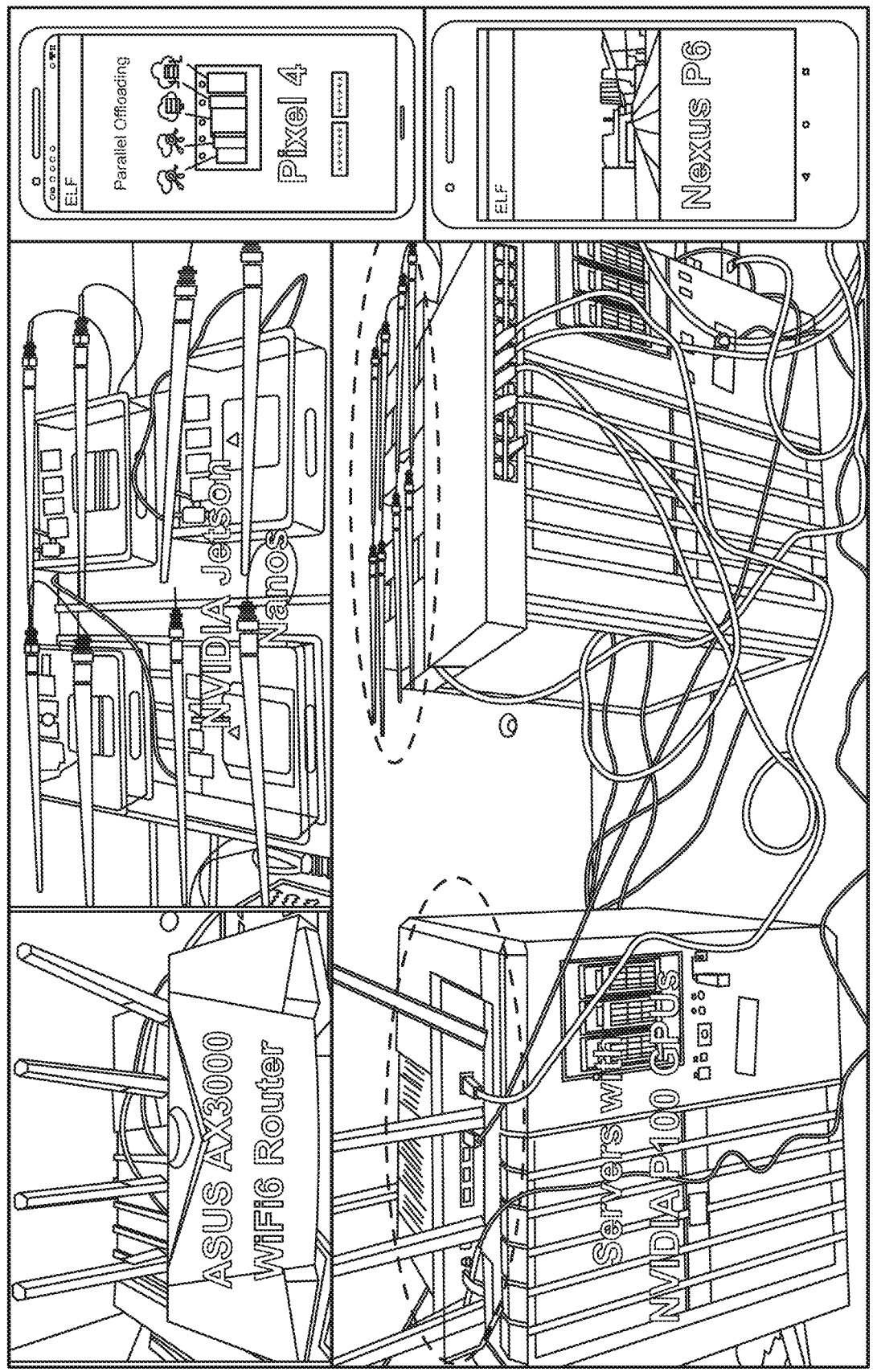
FIG. 7 is a photo depicting hardware components on which the systems and methods of the present disclosure could be implemented.

We use up to 5 edge servers. Each server runs Ubuntu 16.04 and has one NVIDIA Tesla P100 GPU (3,584 CUDA Cores), Intel Xeon CPU (E5-2640 v4, 2.40 GHz). Networks: We use WiFi6 (802.11.ax, ASUS-AX3000, 690 Mbps) to connect the mobile platforms and edge servers. Based on the WiFi network, we also use the Linux traffic shaping to emulate a Verizon LTE (120 Mbps) link using the parameters given by a recent Verizon network study. Moreover, we randomly set the available bandwidth of each server in 70% to 100% to introduce the network heterogeneity. The emulated LTE network has been used if not explicitly stated otherwise study the network impacts. FIG. 7 illustrates the experimental platform and the hardware components noted above.

We consider ten state-of-the-art models: CascadeRCNN, DynamicRCNN, Faster-RCNN, FCOS, FoveaBox, FreeAnchor, FSAF, MaskRCNN, NasFPN, and RetinaNet. Also, we use MOTS dataset for instance segmentation, KITTI dataset for multi-object classification, PoseTrack dataset for pose estimation. MaskRCNN has been adopted if not explicitly stated otherwise study the model difference. The existing offloading algorithms are either model parallelism or to filter offloading data.

Next, we evaluate the frame partitioning and offloading module. We first describe the end-to-end latency when different numbers of servers are available for Elf with ten state-of-the-art deep learning networks. Here, we assume each server has only a single GPU available for the mobile application. A special case to consider, if there is only a GPU, Elf will adopt a single RP box that covers all the RPs but removes the surrounding background pixels and stack with the LRC task. KITTI dataset has been resized to the resolution 2560×1980 to study the high-resolution scenario in the section.

Figure 8:
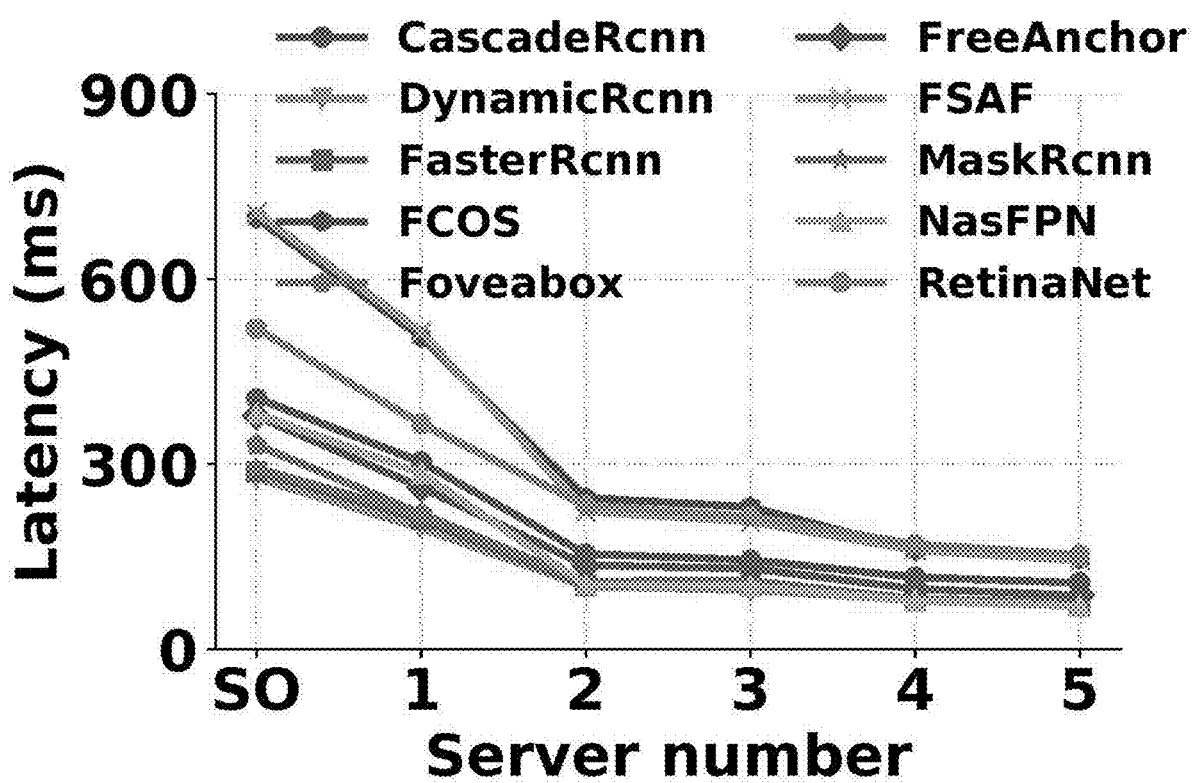
FIGS. 8-21 are graphs illustrating various performance characteristics relating to the systems and methods of the present disclosure.

FIG. 8 is a graph showing the end-to-end latency with the server number from 1 to 5 as well as the Single server Offloading (SO). With only one server available, the system (Elf-1) shows the latency reduction of 1.39× on average, up to 1.50× compared to SO as Elf can efficiently remove the redundant background pixels. When there are two servers available, Elf offloads the LRC task and one of the RP boxes to one server and the other RP box to the second server. Compared to SO, Elf-2 reduces the latency by 2.80× on average, up to 3.63×. When Elf has three or more servers, it uses one server for LRC, and one RP box each on the other servers. We measure a latency reduction of 2.94× on average, up to 3.71× with Elf-3, 3.80× on average, up to 4.85× with Elf-4, and 4.18× on average, up to 5.43× with Elf-5 respectively. The results demonstrate that Elf work with the arbitrary number of available edge servers and it outperforms the SO even with a single server.

We observe that the latency with different server numbers highly depends on the size of the RP boxes shipped to each edge server. With the frame partitioning algorithm, the maximal size of RP box compared to the raw frame as 51.7%, 23.7%, 23.7%, 15.7%, and 11.6%, the computing bottleneck in that offloading round, with the server number from 1 to 5, respectively. Please note that Elf-2 and Elf-3 have the same RP box size because both adopt 2 RP boxes but the later assigns the LRC task on the third server. Accordingly, Elf reduces bandwidth usage by 48.3%, 52.6%, 52.6%, 52.9%, and 53.6%. Importantly, another observation is that the model inference time strongly relates to the in-put size. FIG. 9 shows the inference latency at the server running ten state-of-the-art models with down-sample ratio 0.01·x2 where x is from 1 to 10. Here, the down-sample ratios of 49%, 25%, 16%, and 9% share a rough correspondence to the RP box size with the server numbers of 1, 2 3, 4, and 5. This observation is the underlying reason why the system can significantly reduce the inference latency by having each server inferring part of the frame.

Moreover, we identify the inference time shows distinct sensitivity among different deep vision models. First, the models, for example, FCOS, with more, even fully, convolutional operations present a stronger correlation between frame resolution and inference latency. Second, two-stage models, for example, RCNN series, usually generate the same number of Regions of Interest (ROI) independent of the input resolution and then ship each of them down the pipeline. The second stage thus costs the same time. Overall, the following observations are made: (1) one-stage models with more convolutional operations are preferred, and (2) two-stage models can dynamically adjust the number of ROI based on the frame resolution as a higher resolution input potentially involves more objects.

Figure 10:
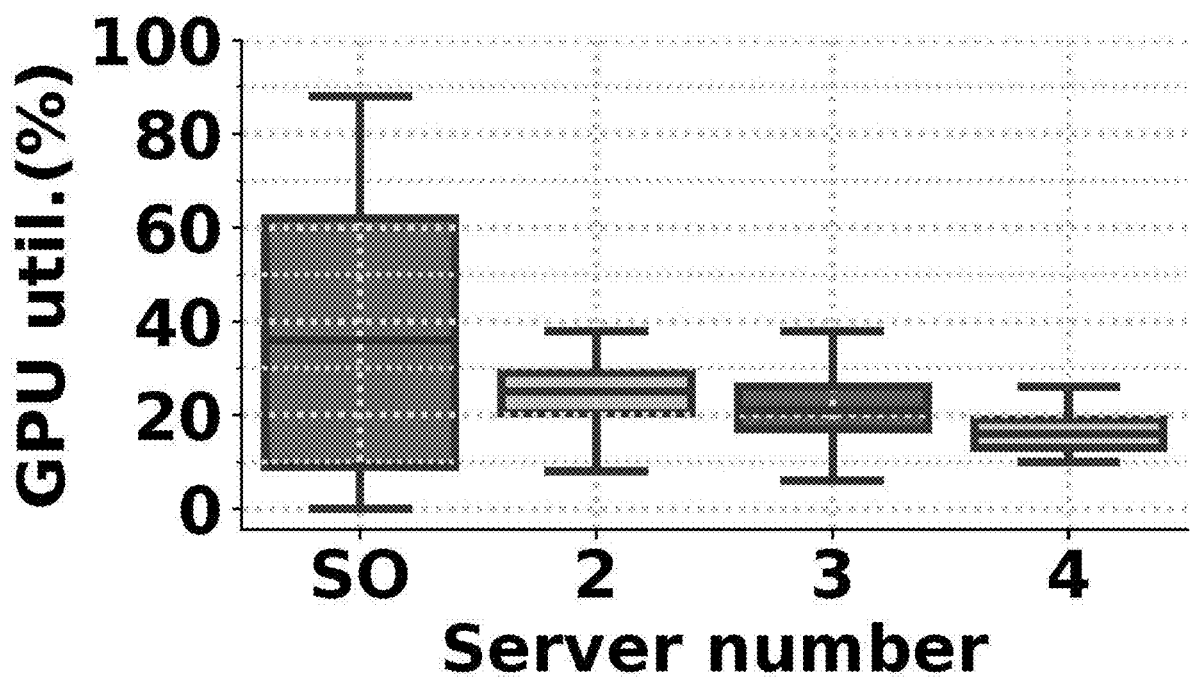

The average GPU utilization under different configurations is illustrated in FIG. 10. In the case of SO, the average GPU utilization is 37% and the 95th percentile is 82%. In the case of Elf-3, the average GPU utilization is 21% and the 95th percentile is 31%. We note that using 3 GPUs in the case of Elf-3 shows lower per GPU utilization than SO. In average, Elf-3 only consumes 1.7×GPU utilization in total running with 3 GPUs, than SO to finish a single request. Moreover, a lower per GPU utilization allows Elf to have more chance to efficiently utilize those resource fragmentation and thus improve the total GPU utilization of edge servers.

After discussing how the system can contribute to minimizing the latency with parallel offloading, it is critical to show that it has limited impacts upon the accuracy of deep vision applications. Three popular applications have been evaluated: instance segmentation with MaskRCNN, object classification with RetinaNet, and multi-person pose estimation with DensePose. We report the inference accuracy in the following 4 settings: (1) TX2, a baseline running the application on Jetson TX2, (2) Nano, a baseline running the application on Jetson Nano, (3) SO, a baseline of existing offloading strategy that offloads the CNN inference to a single edge server with Nexus 6P, (4) Elf, our approach of partitioning the frame and offloading the partial inferences to edge servers (using 3 servers as an example) with Pixel 4.

Table 1, below, reports the accuracy in all the settings. Compared to using the entire frame for inference as in SO or running locally on Jetson Nano or TX2, Elf achieves almost the same accuracy: 0.799 vs 0.803 (0.49%) for instance segmentation, 0.671 vs 0.672 (0.14%) for object classification and 0.654 vs 0.661 (1.05%) for pose estimation. Such an accuracy drop is because (1) running LRC once every 3 frames may miss/delay new or tiny objects, although it rarely happens, and (2) Elf removes the background pixels not covered by the RP boxes. However, we believe this small accuracy drop is acceptable, especially considering the significant latency reduction.

Figure 11:
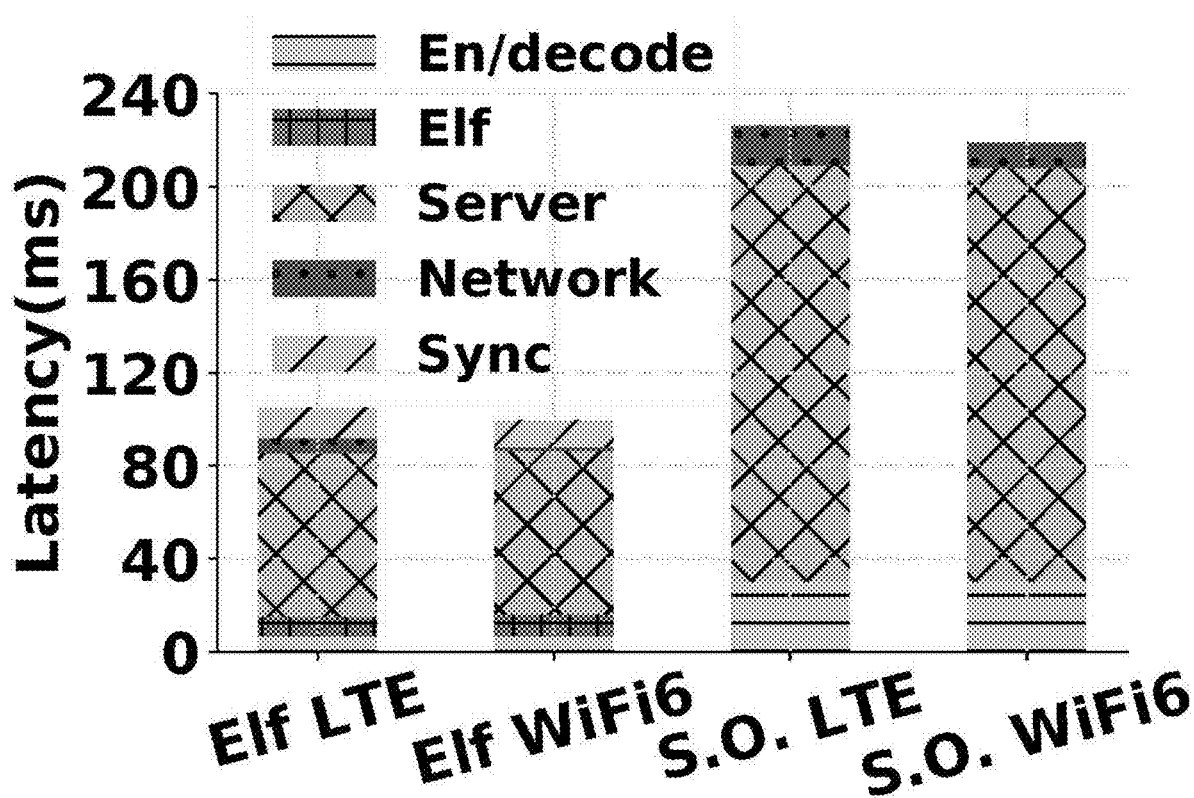
Figure 12:
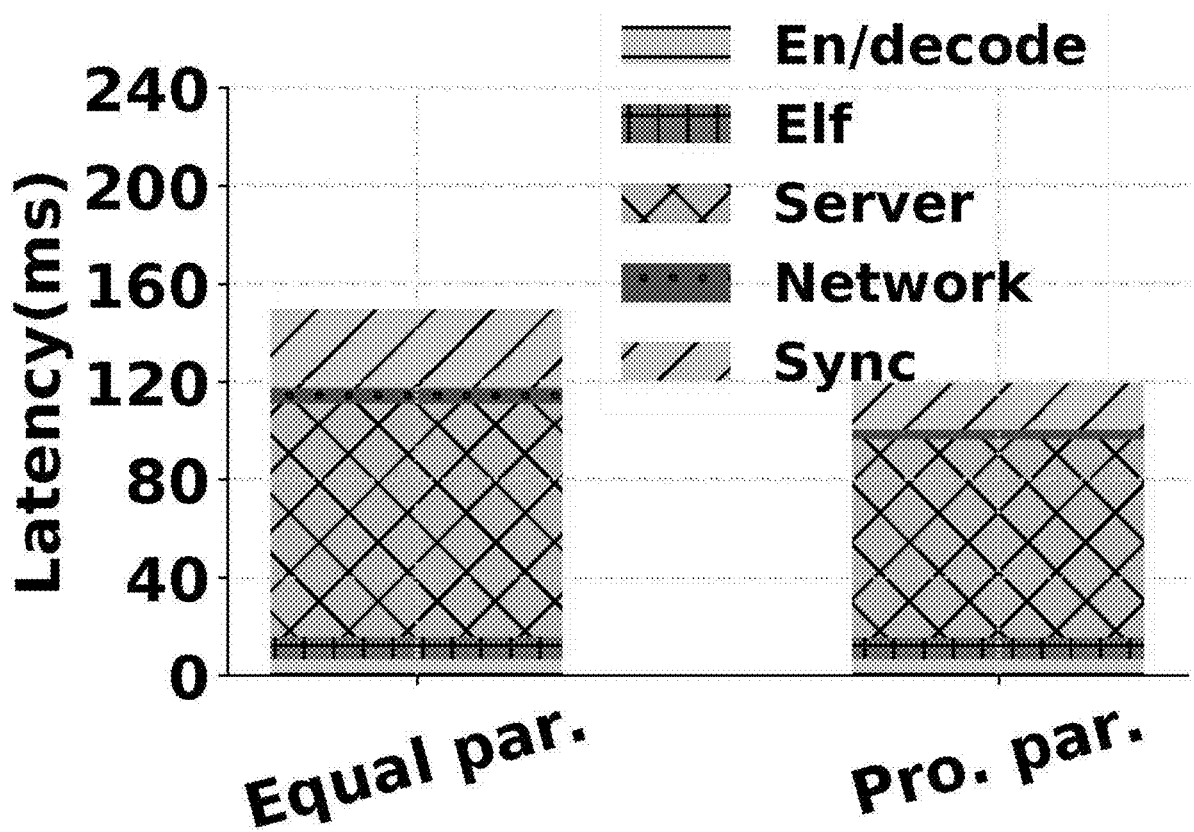
Figure 15:
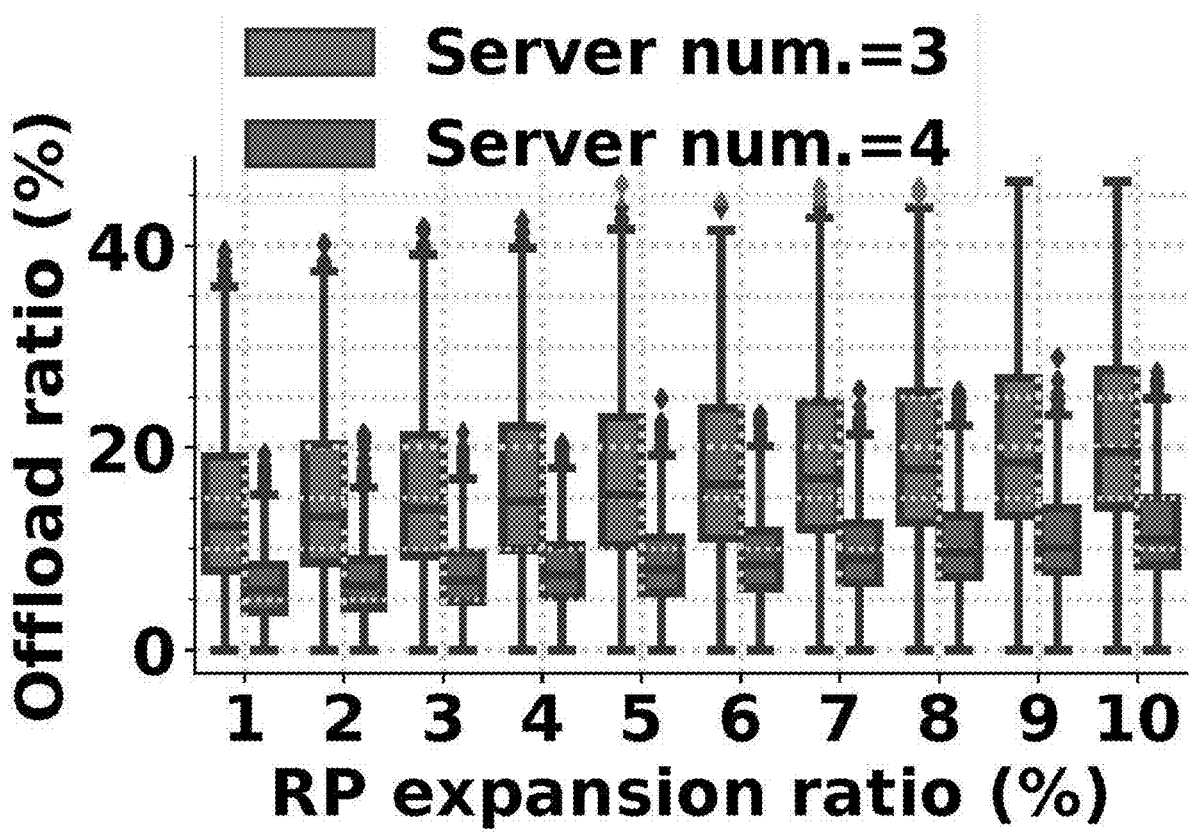

First, we compare Elf-3 and SO with Verizon LTE (120 Mbps) and WiFi6 (690 Mbps) networks. FIG. 11 shows that when switching from WiFi6 to LTE, the network latency of Elf increases from 1.4 ms to 6.5 ms and that of SO increases from 10.1 ms to 17.1 ms. Elf is less sensitive to the network bandwidth because it offloads much less data than SO as shown in FIG. 15. Next, we increase the GPU utilization of one server to 70% and compare our resource-aware RP box allocation method with a resource-agnostic equal RP box allocation method. FIG. 12 shows that our method results in a latency of 119 ms while the other method has a latency of 149 ms.

Figure 13:
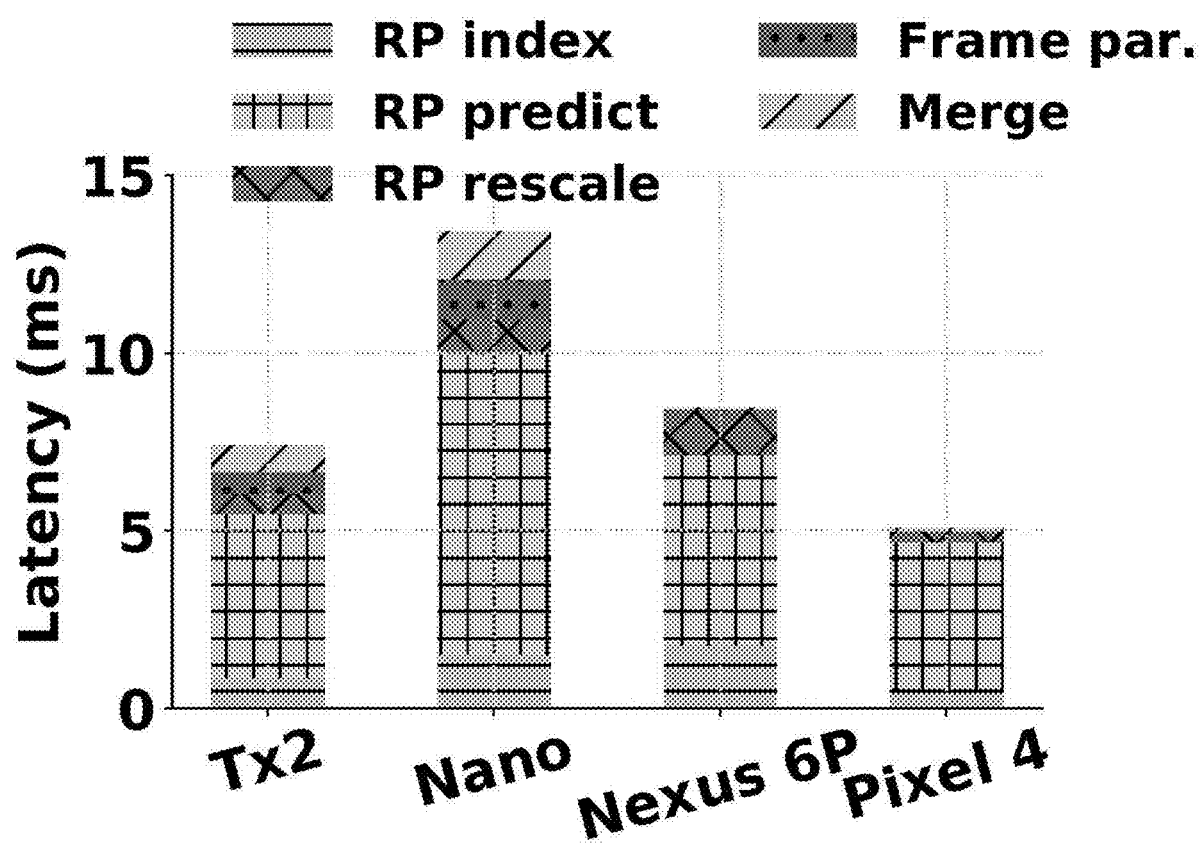

The system incurs a small amount of overhead on the mobile side. FIG. 13 shows the latency of five Elf functions. Jetson TX2 and Nano are evaluated with the Python implementation and take 7 ms, and 13.6 ms in total. Nexus 6P and Pixel 4 are evaluated with C++ by Java native interface and cost 7.8 ms and 4.8 ms in total. The incurred system overhead is sufficiently low to deliver its parallel offloading functions for the significant latency reduction. Moreover, RP prediction costs 70%+ of the total time as the attention LSTM model is implemented in Python and exported to C++ with TorchScript.

Two online available video datasets, KITTI and CityScapes, that contain object labels for each frame were used in the training. Using 60% of the dataset as training data, we applied the RP indexing algorithm to maintain a consistent order of region proposals. Finally, we train the network using Adam optimizer with a learning rate of 1e-3 to minimize the loss function in Equation (1).

TABLE 1

Comparisons of inference accuracy (AP) in three deep vision: instance segmentation [33], applications: object classification [63], and pose estimation [68].

| Deep Vision Applications | Accuracy (AP) | | | |
| --- | --- | --- | --- | --- |
| | TX2 | Nano | SO | Elf |
| Instance Segmentation | 0.803 | 0.803 | 0.803 | 0.799 |
| Object Classification | 0.672 | 0.672 | 0.672 | 0.671 |
| Pose Estimation | 0.661 | 0.661 | 0.661 | 0.654 |

Figure 18:
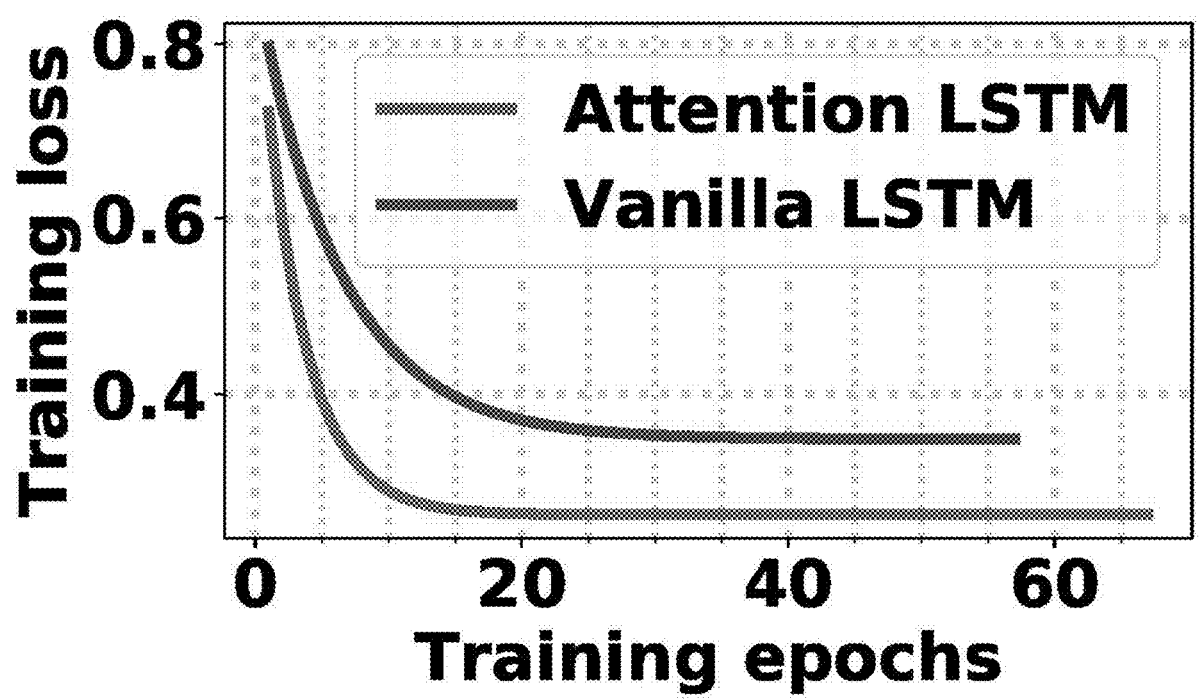
Figure 19:
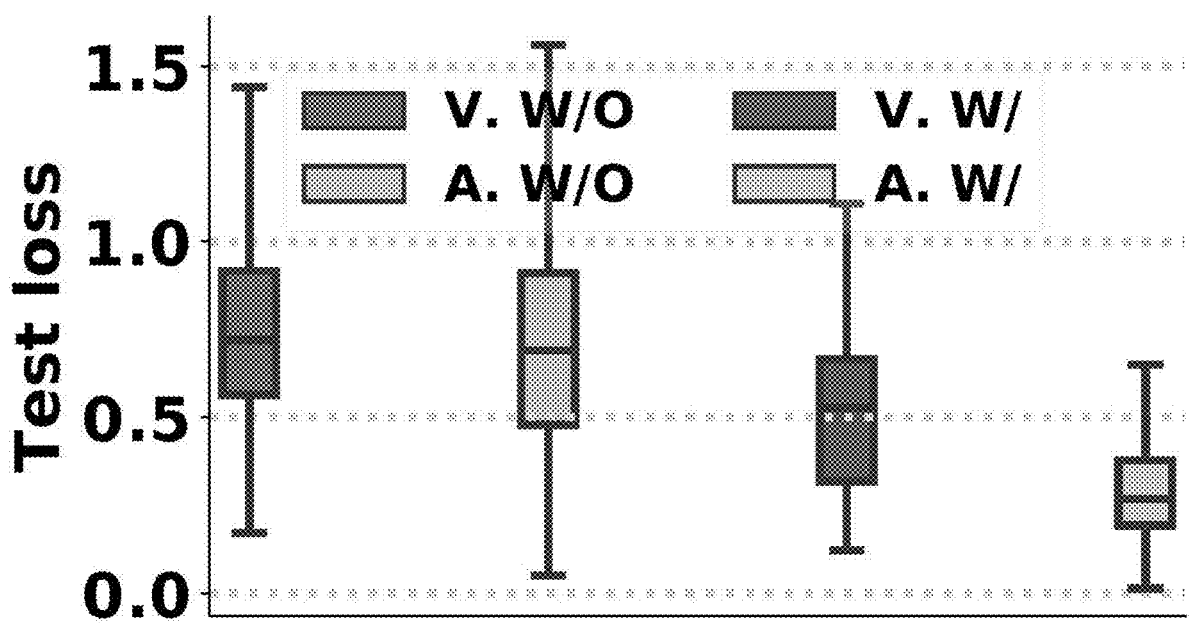
Figure 20:
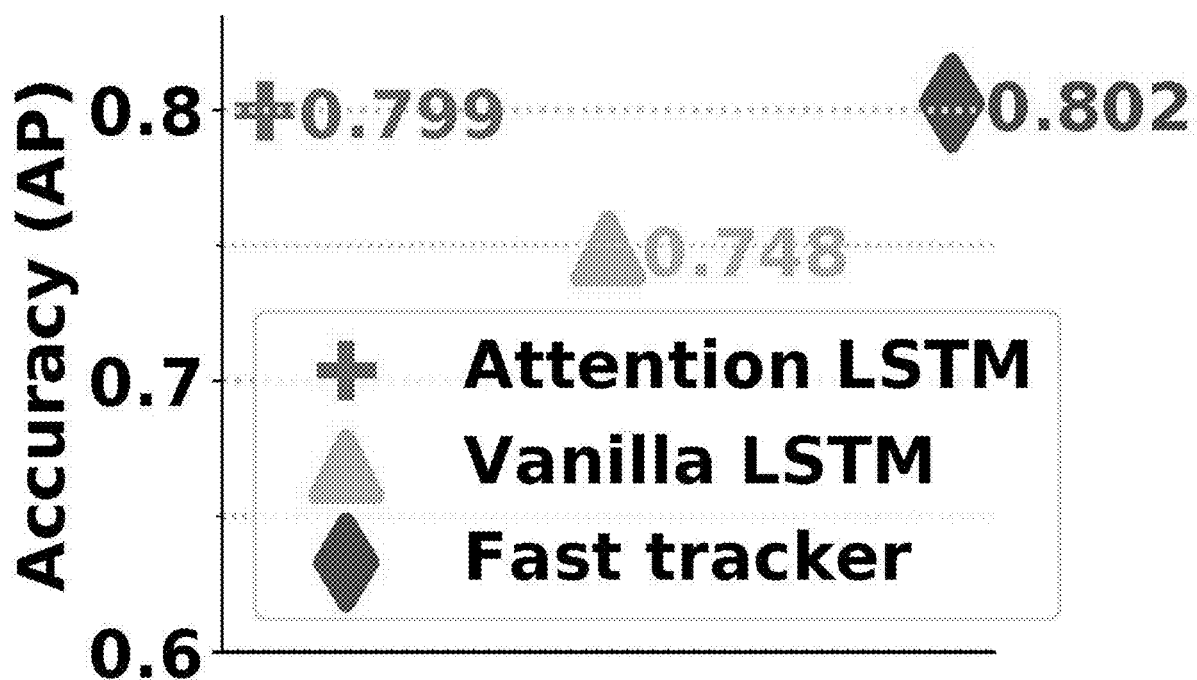
Figure 21:
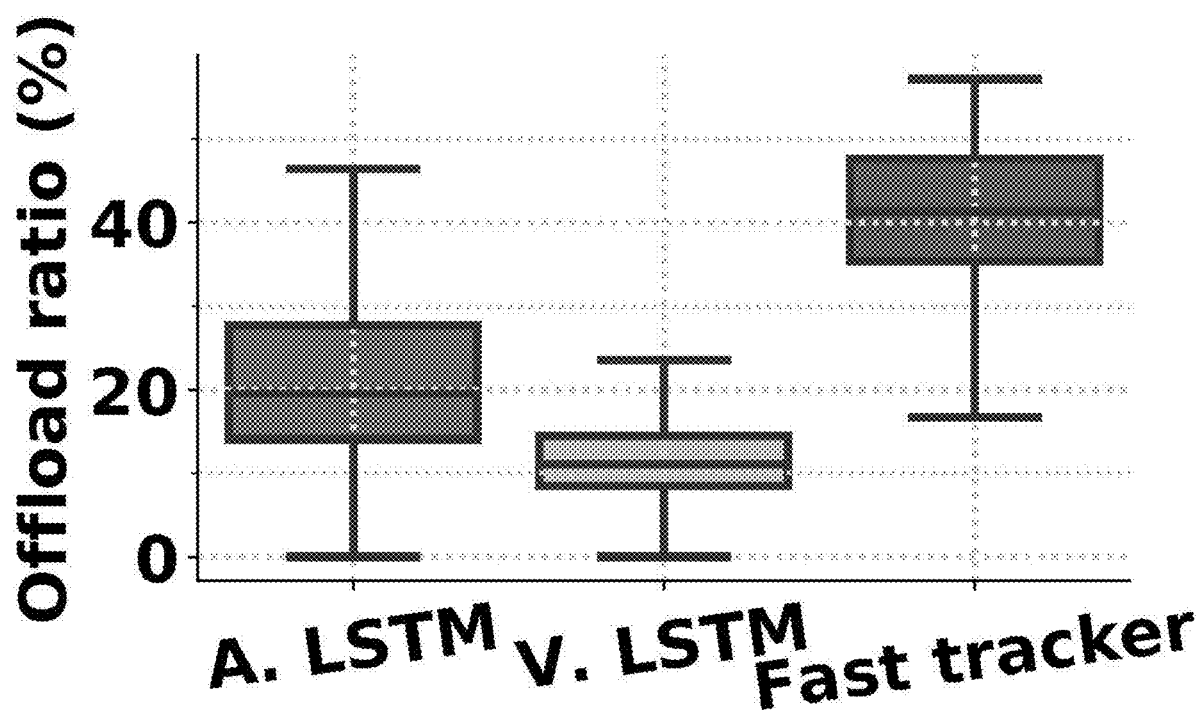

FIG. 18 shows the training loss curve in the first 60 epochs and the loss on the test dataset is shown in FIG. 19. The trend shows that our attention LSTM outperforms vanilla LSTM that demonstrates remarkable accuracy in those prediction work, by reducing the test loss from 0.51 to 0.25, as it can pay more attention to more recent frames. Further, we report the impact of different prediction algorithms on the inference accuracy while keeping other modules the same. Here, we also con-sider FastTracker, which predicts the current RPs as the RPs in the previous video frame, but with a scale-up of 200%, as the baseline. FIGS. 20-21 show the inference accuracy and the offload ratio (defined as the ratio of the total offloading traffic, with respect to the offloading traffic in SO). The vanilla LSTM predictor has the lowest offloading traffic, with an 11% offload ratio, but at a considerable inference accuracy downgrade compared to our attention LSTM, 0.748 vs. 0.799. Meanwhile, FastTracker shows a slightly higher inference accuracy compared to us, 0.802 vs 0.799, but the offloading traffic almost doubles. All things considered, our attention LSTM achieves a good inference accuracy with reasonably low offloading traffic.

Figure 14:
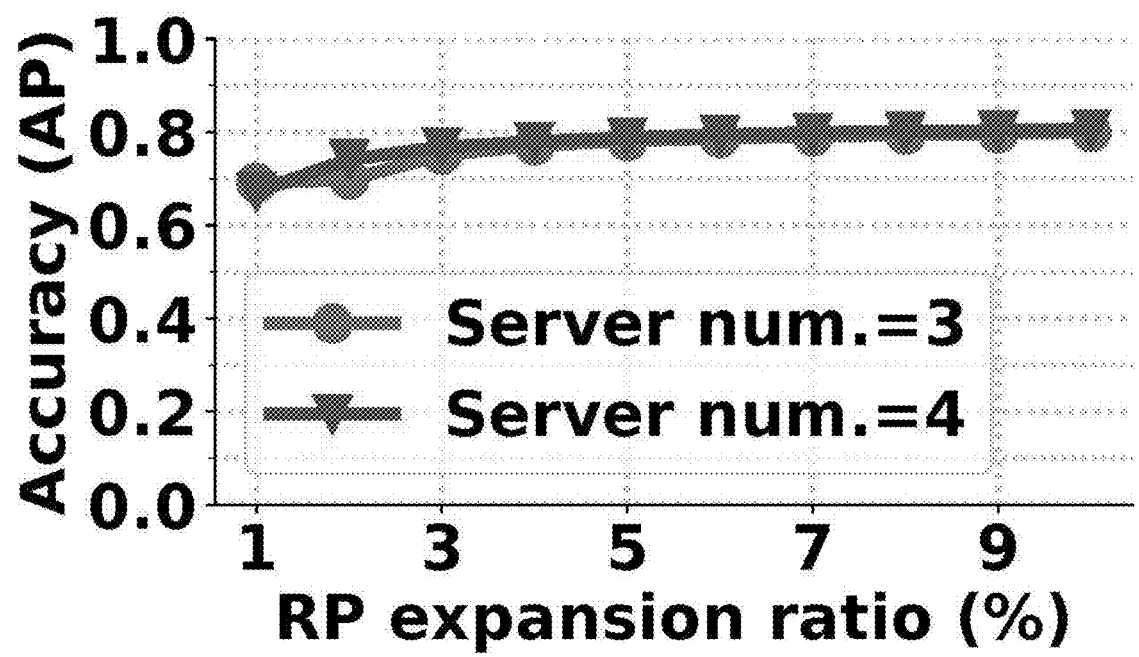

Next, we demonstrate the importance of maintaining a consistent RP index across video frames. FIG. 19 shows the test loss of two prediction algorithms with and without RP indexing. With RP indexing, vanilla LSTM reduces the loss from 0.71 to 0.51 and attention LSTM reduces the loss from 0.7 to 0.25. Moreover, the RP expansion ratio trades off the application accuracy with the average offloading traffic volume, i.e., a larger ratio leads to a higher application accuracy at the cost of more offloading data. FIGS. 14-15 show the trade-off with different expansion ratios. After increasing the RP expansion ratio to 4% or higher, the accuracy stays at 0.799, the highest Elf can achieve. However, when Elf has the ratio under 4%, we observe an accuracy downgrade. For example, the accuracy is 0.70 and 0.75 when the expansion ratio is 1% and 2%, respectively. Also, we identify the same pattern with Elf-3 and Elf-4. On the other hand, with an RP extension ratio of 4%, the offload ratio is 7% for Elf-3 and 13% for Elf-4.

We then show LRC can efficiently detect new objects when first appear. FIG. 16 presents the accuracy using the down-sampled frames for inference with a down-sampling scale x increasing from 1 to 10, with the resulting frame size from 0.01×x2. At the scale of 8, the accuracy degrades to 0.75, and at the scale of 4, the accuracy goes down to 0.62. The result indicates that using low-resolution frames alone hurts application accuracy. FIG. 17 illustrates the inference accuracy by offloading frame partitions and LRC with different down-sample ratios. When the LRC ratio has been increased to 16%, the accuracy keeps at 0.799 (the SO solution achieves 0.803).

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A system for acceleration of high-resolution mobile deep vision with content-aware parallel offloading, comprising:
a mobile device having a processor and a memory, said processor of said mobile device programmed to:
receive an input frame;
process the input frame to generate a plurality of region proposals;
partition the input frame into a plurality of region proposal boxes using the plurality of region proposals;
offload, in parallel, the plurality of region proposal boxes to a plurality of edge servers based on contents of the plurality of region proposal boxes, the plurality of edge servers processing the plurality of region proposal boxes to generate object metadata;
receive the object metadata from the plurality of edge servers;
process the object metadata and the input frame to generate a final image; and
display the final image to a user of the mobile device.

2. The system of claim 1, wherein the processor of the mobile device is programmed to resize at least one of the plurality of region proposal boxes prior to offloading the plurality of region proposal boxes to the plurality of edge servers.

3. The system of claim 1, wherein the each of the plurality of edge servers executes a computer vision algorithm to generate object metadata from one of the plurality of region proposal boxes.

4. The system of claim 1, wherein the processor partitions the input frame into the plurality of region proposal boxes using an attention based Long-Short Term Prediction Network (LSTM).

5. The system of claim 4, wherein the processor predicts future region proposals based on region proposals detected in historical frames by the LSTM.

6. The system of claim 3, wherein the computer vision algorithm comprises a convolutional neural network (CNN) model.

7. The system of claim 1, wherein the mobile device generates an augmented reality image that includes the input frame and one or more indicia superimposed on the input frame to indicate the presence of an object in the input frame.

8. The system of claim 1, wherein the processor discards background pixels of the input frame that are unlikely to contain region proposals.

9. The system of claim 1, wherein the processor load balances the plurality of edge servers by determining computation costs for each of the plurality of region proposal.

10. The system of claim 9, wherein the processor matches the plurality of region proposals to the plurality of edge servers based on the determined computation costs.

11. A method for acceleration of high-resolution mobile deep vision with content-aware parallel offloading, comprising the steps of:
receiving an input frame at a mobile device;
processing the input frame at the mobile device to generate a plurality of region proposals;
partitioning the input frame at the mobile device into a plurality of region proposal boxes using the plurality of region proposals;
offloading, in parallel, the plurality of region proposal boxes to a plurality of edge servers based on contents of the plurality of region proposal boxes, the plurality of edge servers processing the plurality of region proposal boxes to generate object metadata;
receiving at the mobile device the object metadata from the plurality of edge servers;
processing at the mobile device the object metadata and the input frame to generate a final image; and
displaying the final image to a user of the mobile device.

12. The method of claim 11, further comprising resizing at the mobile device at least one of the plurality of region proposal boxes prior to offloading the plurality of region proposal boxes to the plurality of edge servers.

13. The method of claim 11, further comprising executing a computer vision algorithm at each of the plurality of edge servers to generate object metadata from one of the plurality of region proposal boxes.

14. The method of claim 11, further comprising partitioning the input frame into the plurality of region proposal boxes using an attention based Long-Short Term Memory (LSTM).

15. The method of claim 14, further comprising predicting future region proposals based on region proposals detected in historical frames by the LSTM.

16. The method of claim 13, wherein the computer vision algorithm comprises a convolutional neural network (CNN) model.

17. The method of claim 11, further comprising generating an augmented reality image that includes the input frame and one or more indicia superimposed on the input frame to indicate the presence of an object in the input-image frame.

18. The method of claim 11, further comprising discarding background pixels of the input frame that are unlikely to contain region proposals.

19. The method of claim 11, further comprising load balancing the plurality of edge servers by determining computation costs for each of the plurality of region proposal.

20. The method of claim 19, further comprising matching the plurality of region proposals to the plurality of edge servers based on the determined computation costs.

* * * * *

UNITED STATES PATENT AND TRADEMARK OFFICE
CERTIFICATE OF CORRECTION

PATENT NO. : 12,198,426 B2
APPLICATION NO. : 17/689089
DATED : January 14, 2025
INVENTOR(S) : Dipankar Raychaudhuri et al.

Page 1 of 1

It is certified that error appears in the above-identified patent and that said Letters Patent is hereby corrected as shown below:

In the Claims

In Column 20, Line 49, Claim 17, the word "-image" should be deleted.

Signed and Sealed this
Eighteenth Day of March, 2025

Coke Morgan Stewart
*Acting Director of the United States Patent and Trademark Office*